United States Patent
Racz et al.

(10) Patent No.: US 12,069,180 B1
(45) Date of Patent: Aug. 20, 2024

(54) SYSTEMS AND METHODS FOR RETRIEVING DATA FROM A CHAIN DATA STRUCTURE

(71) Applicant: GENETEC INC., Montréal (CA)

(72) Inventors: Pierre Racz, Montréal (CA); Vincent Labrecque, Montréal (CA); Antoine Lennartz, La Prairie (CA); Vincent Beaulieu, Sherbrooke (CA)

(*) Notice: Subject to any disclaimer, the term of this patent is extended or adjusted under 35 U.S.C. 154(b) by 287 days.

(21) Appl. No.: 17/512,115

(22) Filed: Oct. 27, 2021

(51) Int. Cl.
*H04L 9/32* (2006.01)
*G06F 16/22* (2019.01)
*H04L 9/00* (2022.01)

(52) U.S. Cl.
CPC ........ *H04L 9/3239* (2013.01); *G06F 16/2255* (2019.01); *H04L 9/50* (2022.05)

(58) Field of Classification Search
CPC ...... H04L 9/3239; H04L 9/50; G06F 16/2255
See application file for complete search history.

(56) References Cited

U.S. PATENT DOCUMENTS

| | | | |
|---|---|---|---|
| 10,592,873 B2 | 3/2020 | Russinovich | |
| 11,423,161 B1 | 8/2022 | Racz et al. | |
| 2020/0076576 A1* | 3/2020 | Ahlbäck | H04L 9/0637 |
| 2021/0091957 A1* | 3/2021 | Ford | H04L 9/3263 |
| 2021/0182314 A1* | 6/2021 | Hancock | H04L 9/0643 |
| 2021/0342471 A1* | 11/2021 | Larsen | G06F 21/6245 |
| 2022/0083507 A1* | 3/2022 | Crowell | H04L 9/3236 |
| 2022/0131699 A1* | 4/2022 | Kimmel | H04L 63/0861 |

FOREIGN PATENT DOCUMENTS

| | | |
|---|---|---|
| WO | 2017/083980 A1 | 5/2017 |
| WO | 2017/083985 A1 | 5/2017 |
| WO | 2021/081630 A1 | 5/2021 |

* cited by examiner

*Primary Examiner* — Cheng-Feng Huang
(74) *Attorney, Agent, or Firm* — Anglehart et al.

(57) ABSTRACT

A secure chain data structure is stored by grouping source data into blocks of data, calculating a hash value of an immediate prior block for each block of said blocks of data and a hash value of a non-immediate prior block for at least some blocks of said blocks of data, associating the hash value or values of each block with each block of said blocks of data, and storing said blocks of data and their associated hash values to form a secure chain data structure. Trust can be provided to blocks in the secure chain data structure by later blocks containing valid hash values of prior blocks including valid ones of the hash values of non-immediate prior blocks.

20 Claims, 12 Drawing Sheets

| Chain | Block | Previous | DistanceToPrevious | Next | DistanceToNext | Compound Integrity |
|---|---|---|---|---|---|---|
| c1 | b1-01 | | | b1-02 | 1 | 7 |
| c1 | b1-02 | b1-01 | 1 | b1-03 | 1 | 6 |
| c1 | b1-03 | b1-02 | 1 | b1-04 | 1 | 5 |
| c1 | b1-04 | b1-03 | 1 | b1-05 | 1 | 4 |
| c1 | b1-05 | b1-04 | 1 | b1-06 | 1 | 3 |
| c1 | b1-06 | b1-05 | 1 | | | 2 |

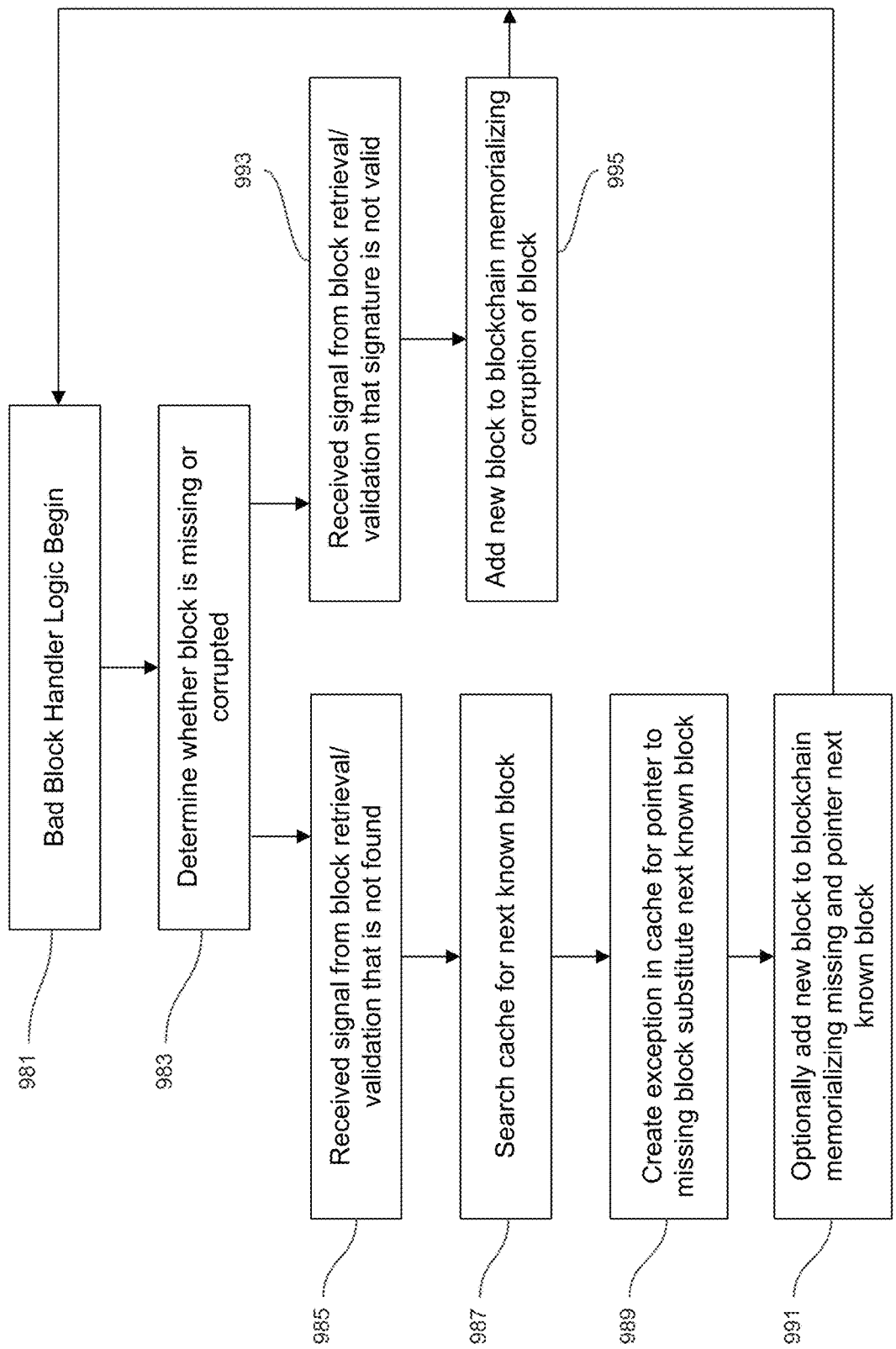

| Chain | Block | Previous | DistanceToPrevious | Next | DistanceToNext | Compound Integrity |
|---|---|---|---|---|---|---|
| c1 | b1-06 | | | b1-08 | 2 | 11 |
| c1 | b1-08 | b1-06 | 2 | b1-09 | 1 | 11 |
| c1 | b1-09 | b1-08 | 1 | b1-10 | 1 | 10 |
| c1 | b1-10 | b1-09 | 1 | b1-13 | 3 | 9 |
| c1 | b1-13 | b1-10 | 3 | b1-15 | 2 | 8 |
| c1 | b1-15 | b1-13 | 2 | b1-19 | 4 | 8 |
| c1 | b1-19 | b1-15 | 4 | b1-22 | 3 | 12 |
| c1 | b1-22 | b1-19 | 3 | b1-27 | 5 | 11 |
| c1 | b1-27 | b1-22 | 5 | b1-28 | 1 | 10 |
| c1 | b1-28 | b1-27 | 1 | b1-29 | 1 | 9 |
| c1 | b1-29 | b1-28 | 1 | b1-31 | 2 | 8 |
| c1 | b1-31 | b1-29 | 2 | b1-32 | 1 | 8 |
| c1 | b1-32 | b1-31 | 1 | b1-34 | 2 | 7 |
| c1 | b1-34 | b1-32 | 2 | b1-36 | 2 | 7 |
| c1 | b1-36 | b1-34 | 2 | b1-37 | 1 | 7 |
| c1 | b1-37 | b1-36 | 1 | b1-38 | 1 | 6 |
| c1 | b1-38 | b1-37 | 1 | b1-40 | 2 | 2 |
| c1 | b1-40 | b1-38 | 2 | b1-42 | 2 | 5 |
| c1 | b1-42 | b1-40 | 2 | b1-45 | 3 | 5 |
| c1 | b1-45 | b1-42 | 3 | b1-46 | 1 | 4 |
| c1 | b1-46 | b1-45 | 1 | b1-49 | 3 | 3 |
| c1 | b1-49 | b1-46 | 3 | b1-55 | 6 | 2 |
| c1 | b1-55 | b1-49 | 6 | b1-58 | 3 | 3 |
| c1 | b1-58 | b1-55 | 3 | | | 2 |

Fig. 10

SYSTEMS AND METHODS FOR RETRIEVING DATA FROM A CHAIN DATA STRUCTURE

BACKGROUND

Technical Field

The present disclosure generally relates to storing data in a chain data structure and to retrieving data from a chain data structure.

Description of the Related Art

Blockchain data structures provide for cryptographically secure storage of data in a largely immutable and tamper-proof way. Conventional public blockchain data structures provide for widespread peer-to-peer replication of data and a concensus mechanism to ensure agreement among participants. Such features can be burdensome and unnecessary in the context of a private blockchain infrastructure. However, eliminating widespread replication can make systems vulnerable to partial data loss or corruption. In a conventional blockchain data structure, blocks are linked together by a reference in each block to a previous block. Consequently, the loss or corruption of a single block can result in a blockchain breaking into disjoint chains which cannot be readily reconstructed into an ordered sequence of blocks. Furthermore, the features of a conventional blockchain which provide for immutable storage of data can be disadvantageous in use cases where some degree of manipulation of the stored data is needed.

BRIEF SUMMARY

In disclosed embodiments, a chain data structure contains data blocks having multiple ancestor pointers, which provides integrity preservation and allows inferring relative ordering over blocks in the face of data loss, corruption, and/or deliberate deletion. In some embodiments, an index is generated which provides for the retrieval of correctly-ordered sequences of data from the blocks of a chain data structure, even if there has been significant data block loss which has resulted in the formation of disjoint chains of blocks. In some embodiments, cumulative integrity values are determined for each block and for an entire data chain, or a portion thereof, to enable applications to provide warnings and take other actions if integrity levels are not acceptable. In some embodiments, consumers of the data contained in chain data structures are able to specify different data integrity requirements depending upon their use case. In disclosed embodiments, service blocks can be added to a chain to perform operations such as editing and deletion of blocks earlier in the chain.

In some disclosed embodiments, a method of storing data with a secure chain data structure is provided. The method comprises grouping source data into blocks of data; calculating a hash value of an immediate prior block for each block of said blocks of data and a hash value of a non-immediate prior block for at least some blocks of said blocks of data, wherein said calculating said hash value is based on each block of said blocks of data and any hash value associated with said non-immediate prior block and with said immediate prior block, respectively; associating the hash value or values of each block with each block of said blocks of data; storing said blocks of data and their associated hash values to form a secure chain data structure; wherein trust can be provided to blocks in the secure chain data structure by later blocks containing valid hash values of prior blocks including valid ones of said hash values of non-immediate prior blocks.

In some embodiments, said calculating comprises calculating a collision-resistant cryptographic hash value. In some embodiments, said non-immediate prior block has a distance from a current block by a number greater than two. In some embodiments, said number is a prime number. In some embodiments, said number is fixed. In some embodiments, said number is variable. In some embodiments, said storing said blocks of data and their related hash values comprises storing each of said blocks with their respective said hash values. In some embodiments, said storing said blocks of data and their related hash values comprises storing a pointer to said immediate prior blocks. In some embodiments, said storing said blocks of data and their related hash values comprises storing a pointer to said non-immediate prior block block for said at least some blocks of said blocks of data. In some embodiments, said hash value is used as a logical filename in a data storage medium. In some embodiments, the method further comprises building an index of said blocks of data. In some embodiments, the method further comprising adding to said index information concerning one or more of: a sequence of said blocks of data in a direction from earlier to later blocks; identifying when a block is missing; identifying when a block's data fails to be validated by its corresponding hash value; error correction data; how to skip over a missing or corrupted one or ones of said blocks of data. In some embodiments, associating the hash value or values of each block with each block of said blocks of data comprises associating hash values of more than one non-immediate prior block to at least some of said blocks of data.

In some disclosed embodiments, there is provided a method of retrieving data in a chain data structure stored in blocks including a hash value of an immediate prior block and for at least some blocks also including a hash value of a non-immediate prior block, the blocks thus forming a stored chain data structure. In this way, trust is provided to blocks in the chain by later blocks containing valid hash values of prior blocks including valid ones of said hash values of non-immediate prior blocks. The method may comprise retrieving blocks from the stored chain data structure, wherein, when the chain data structure is broken by a given block being corrupted or unrecoverable, the hash value of the non-immediate prior block from a later block is used to provide trust to blocks prior to the given block.

In some embodiments, a trust value is calculated for each one of the blocks retrieved and is provided as metadata with the blocks. The trust value can be dependent on a number of the later blocks containing valid hash values of prior blocks.

In some embodiments, the hash value can be a cryptographic hash value. The hash value can be a collision resistant hash value, as is known in the art.

In some embodiments, the method can further comprise storing in blocks including a hash value of an immediate prior block and for at least some blocks also including a hash value of a non-immediate prior block, the blocks thus forming a stored chain data structure. In this way, trust can be provided to blocks in the chain by later blocks containing valid hash values of prior blocks including valid ones of the hash values of non-immediate prior blocks. The blocks may be stored including a pointer to the immediate prior block and when applicable to the non-immediate prior block. In some embodiments, the hash value can be used as a logical filename in a data storage medium, as is the case with content addressable storage.

In other embodiments, the method further involves adding a block to the chain data structure making a record when one of the blocks is corrupted or unrecoverable. The record can include correction data correcting an error in the corrupted block or pointing to a valid prior block for skipping the given one of the blocks that is corrupted or unrecoverable. In this way, retrieving blocks from the stored chain data structure may involve using the correction data.

In other embodiments, retrieving blocks from the stored chain data structure may involve building an index of blocks and using the index of blocks to retrieve any desired portion of the blocks in a forward order from most prior to most later. The blocks may comprise a plurality of sequential blocks, each one of the sequential blocks having a chain identifier (ID) and one or more ancestor pointers, each of the one or more ancestor pointers identifying a prior block in the chain data structure, and retrieving blocks from the stored chain data structure may comprises using a data management system having one or more processors and memory for:

producing, using the one or more processors, a map of tail block connections by recursively following, for blocks of a particular chain, the one or more ancestor pointers of each respective block to determine a respective tail block, the respective tail block having a greatest distance value relative to the respective block from among one or more blocks connected to the respective block, the distance value given by a sum of one or more intermediate distance values along one or more ancestor pointers on a path between the respective block and a respective one of the one or more blocks connected to the respective block;

supplementing the map of tail block connections by recursively following, for the blocks of the particular chain, inbound pointers to identify any missing tail block connections to add to the map of tail block connections;

grouping, using the map, the blocks of the particular chain according to the respective tail blocks of the respective blocks to form one or more sets of blocks;

sorting, using the map, each of the one or more sets of blocks according to a distance of each block in a respective set, of the one or more sets of blocks, to a respective tail block of the respective set;

generating an index for the particular chain based at least in part on the grouped and sorted sets of blocks of the map; and retrieving, for the particular chain, a sequence of blocks from the chain data structure based at least in part on the index to produce an ordered data sequence.

In some embodiments, the method may further involve partitioning the blocks based on the chain ID of each of the blocks. Each respective block may comprise one or more ancestor pointers, each of the one or more ancestor pointers may identify a corresponding prior block in the chain data structure by storing a hash of the prior block and a distance value indicating a block count to reach the corresponding prior block from each respective block. A majority of the blocks of the particular chain may each have: (i) an ancestor pointer having a distance value of one, directed to an immediately preceding block; and (ii) at least one other ancestor pointer having a distance value greater than one. In some embodiments, the distance value that is greater than one is a prime number. The map of tail block connections may comprise, for each block in the map, a correspondence between a block identifier (ID) of a respective block and a block pointer identifying a respective tail block, the block pointer including a block ID of the respective tail block and a distance between the respective block and the respective tail block. In generating an index for the particular chain, the index may be generated to comprise, for each block in the index, excluding a first block and a last block: (i) a block identifier; (ii) an identifier of a previous block; and (iii) an identifier of a next block.

In some embodiments, the method may further involve determining, for each block in the index, a respective block-level integrity or trust based at least in part on characteristics of each block in the index. The determining, for each block in the index, a block-level integrity or trust may comprise assigning an integrity level based on a set of defined conditions, including at least one of: (i) whether the subject block has a valid format and claims to be part of a particular chain; (ii) whether the subject block has a valid cryptographic signature; and (iii) whether the subject block is signed by a specified entity.

In some embodiments, the method may further involve determining, for each block in the index, a trust value based at least in part on the respective block-level integrity and a path followed along respective inbound pointers of each block in the index. The determining, for each block in the index, a trust value, may comprise:

recursively following, for each block in the index having a block-level integrity or trust greater than or equal to a defined threshold, the inbound pointers of each respective block to determine a respective longest path, the respective longest path having a greatest distance value from among one or more paths from the respective block, wherein the distance value is given by a count of blocks along the respective longest path which have a block-level integrity or trust greater than or equal to the defined threshold; and adding the distance value of the respective longest path to the block-level integrity or trust of the respective block.

In some embodiments, the particular chain may include at least one service block comprising a service pointer directed to a target block and operation instructions specifying an operation to be performed on the target block, and the method may further comprise:

identifying a service block among the blocks of the particular chain; and executing the operation instructions contained in the service block to perform the operation on the target block.

In some embodiments, in executing the operation instructions contained in the service block, the operation may comprise at least one of: deleting the target block, placing access restrictions on the target block, modifying the target block, splitting the target block into two or more blocks, inserting a new block sequentially adjacent to the target block, and replacing the target block.

In some embodiments, in executing the operation instructions contained in the service block, the service operation may comprise modifying the index to change the sequence of blocks retrieved from the chain data structure.

In some embodiments, there is provided a data storage and management system to retrieve data from a chain data structure, the system comprising one or more processors and memory, the memory of the data storage and management system storing a set of instructions that, as a result of execution by the one or more processors, cause the one or more processors to perform any of the described method embodiments. In some embodiments, there is provided a non-transitory computer-readable storage medium having computer-executable instructions stored thereon that, when executed, cause at least one computer processor to perform any of the described method embodiments.

BRIEF DESCRIPTION OF THE DRAWINGS

FIG. 9B is a flowchart for a method of handling missing or corrupted data from a chain data structure, according to one illustrated embodiment.

FIG. 10 shows an index to retrieve data from a chain data structure containing sequential blocks having multiple ancestor pointers, in which a significant number of blocks have been lost.

DETAILED DESCRIPTION

In the following description, certain specific details are set forth to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Reference throughout this specification to "one implementation," "an implementation," or "implementations" means that a particular feature, structure or characteristic described in connection with the implementation(s) is included in at least one implementation. Thus, appearances of the phrases "in one implementation," "in an implementation," or "in implementations" in the specification are not necessarily all referring to the same implementation(s). Furthermore, the particular features, structures, or characteristics may be combined in any suitable manner in one or more implementations. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Figure 1:
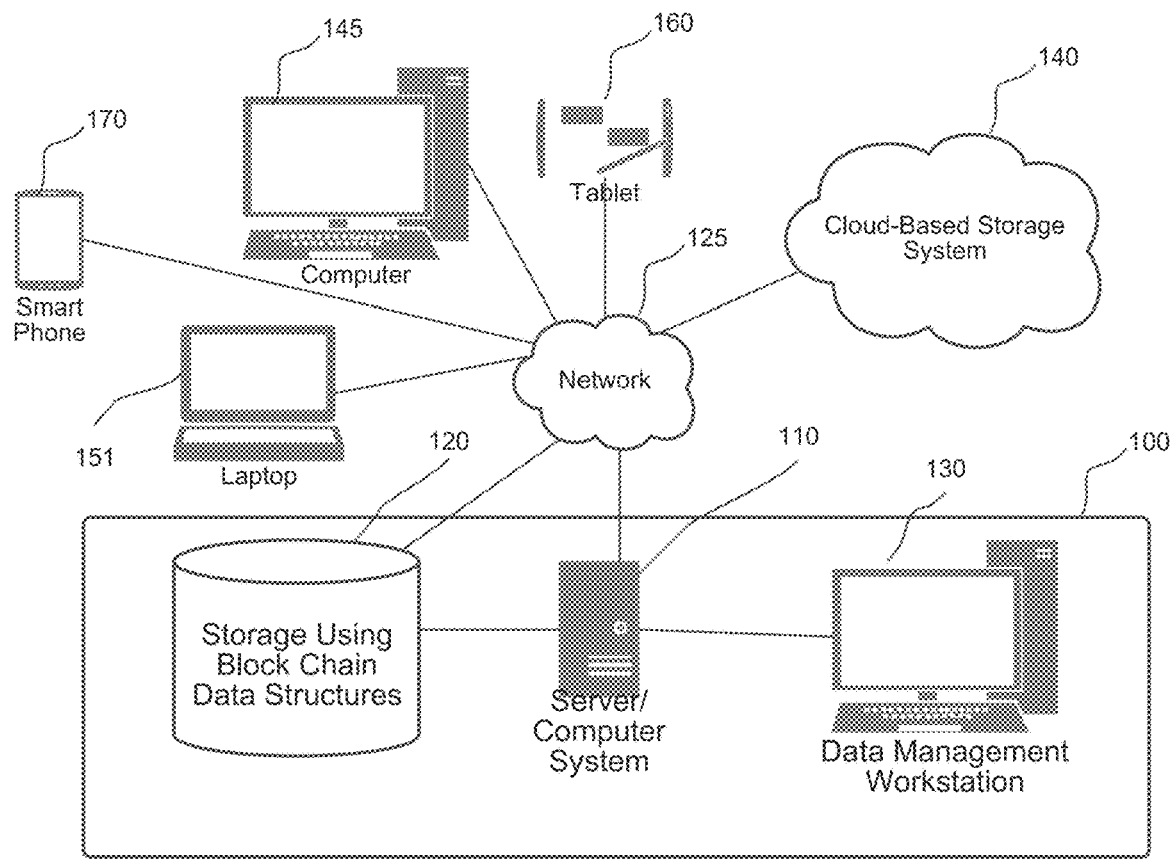
FIG. 1 is a block diagram of a data storage and management system which can be used to retrieve and manipulate data stored using a chain data structure, according to one illustrated embodiment.

FIG. 1 is a block diagram of a data storage and management system 100 which can be used to retrieve and manipulate data stored using a blockchain-type data structure (referred to herein as a "chain" or "chain data structure"). In implementations, the system 100 includes a server/computer system 110 (referred to herein as "server") which executes computer program instructions to carry out methods described herein.

The server 110 interacts with a storage subsystem 120 which uses a chain data structure to store data, such as data received from stream sources, e.g., security video cameras, motion sensors, card readers, microphones, GPS, analytic systems, etc. The server 110 and the storage subsystem 120 may be connected directly or via a network, e.g., a local network (not shown) or a public network 125, e.g., the Internet. In implementations, the storage subsystem 120 may use a "data lake" configuration for storage of large quantities of data in a single store. In such a case, blocks from a multitude of chain data structures, from a multitude of sources, e.g., surveillance video streams, may all be stored together in the single store and retrieved based on the methods described herein. Various other storage configurations are also possible. In implementations, the server 110 may store at least a portion of the data in a remote storage system, such as a cloud-based storage system 140 accessed via the network 125 or a private network. The server 110 may be a cloud-based computing infrastructure.

The server 110 also interacts with a data management workstation 130, which provides a user interface for interacting with and controlling the data storage management system 100. In the case of video data storage, the data management workstation 130 allows a user to, inter alia, store, retrieve, view, manipulate, and distribute video streams stored in the storage subsystem 120. The data management workstation 130 may also allow a user to manage and control the distribution of data, e.g., video data, retrieved from the storage subsystem 120 to remote users via the network 125, such as users connected via personal and mobile devices, e.g., computers 145, laptops 151, and tablets 160, as well as smartphones 170. As discussed in further detail below, the data management workstation 130 may have its own processor or processors and memory and may independently run software for performing methods described herein. Alternatively, the data management workstation 130 may function largely as a client, e.g. using a web browser or client application, while relying, for the most part, on the server 110 to perform methods described herein. In implementations, the server 110 may provide a user interface for interacting with and controlling the data storage management system 100, in which case a separate data management workstation 130 is not necessary.

Figure 2A:
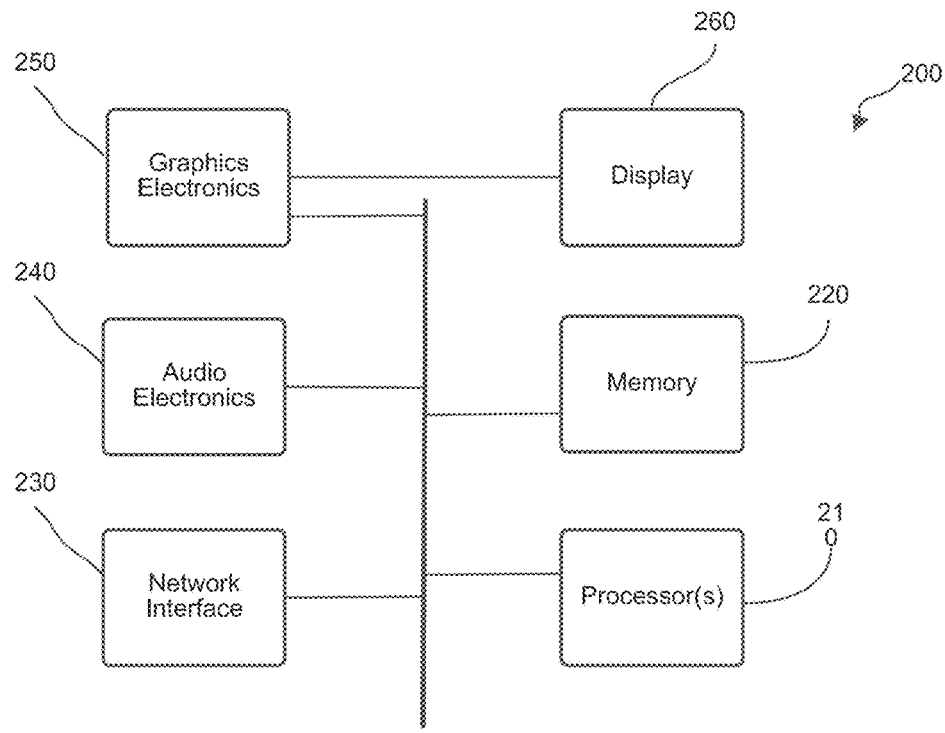
FIG. 2A is a block diagram of the server configured to interact with the storage subsystem to retrieve and manipulate data stored using a chain data structure.

FIG. 2A is a block diagram of the server 110 configured to interact with the storage subsystem 120 to retrieve and manipulate data stored using a chain data structure. The server 110 may be implemented as a computing platform 200 having one or more processors 210, memory 220, e.g., random access memory (RAM), to store data and program instructions to be executed by the one or more processors 210. The computing platform 200 also includes a network interface 230, which may be implemented as a hardware and/or software-based component, such as a network interface controller or card (NIC), a local area network (LAN) adapter, or a physical network interface, etc. In implementations in which the server 110 provides a user interface for interacting with and controlling the data storage management system 100, the computing platform 200 may also include audio electronics 240 to output audio to a user, graphics electronics 250 to render video data, e.g., a video graphics card and/or processor, and a display 260 to display the user interface and rendered video to the user.

Figure 2B:
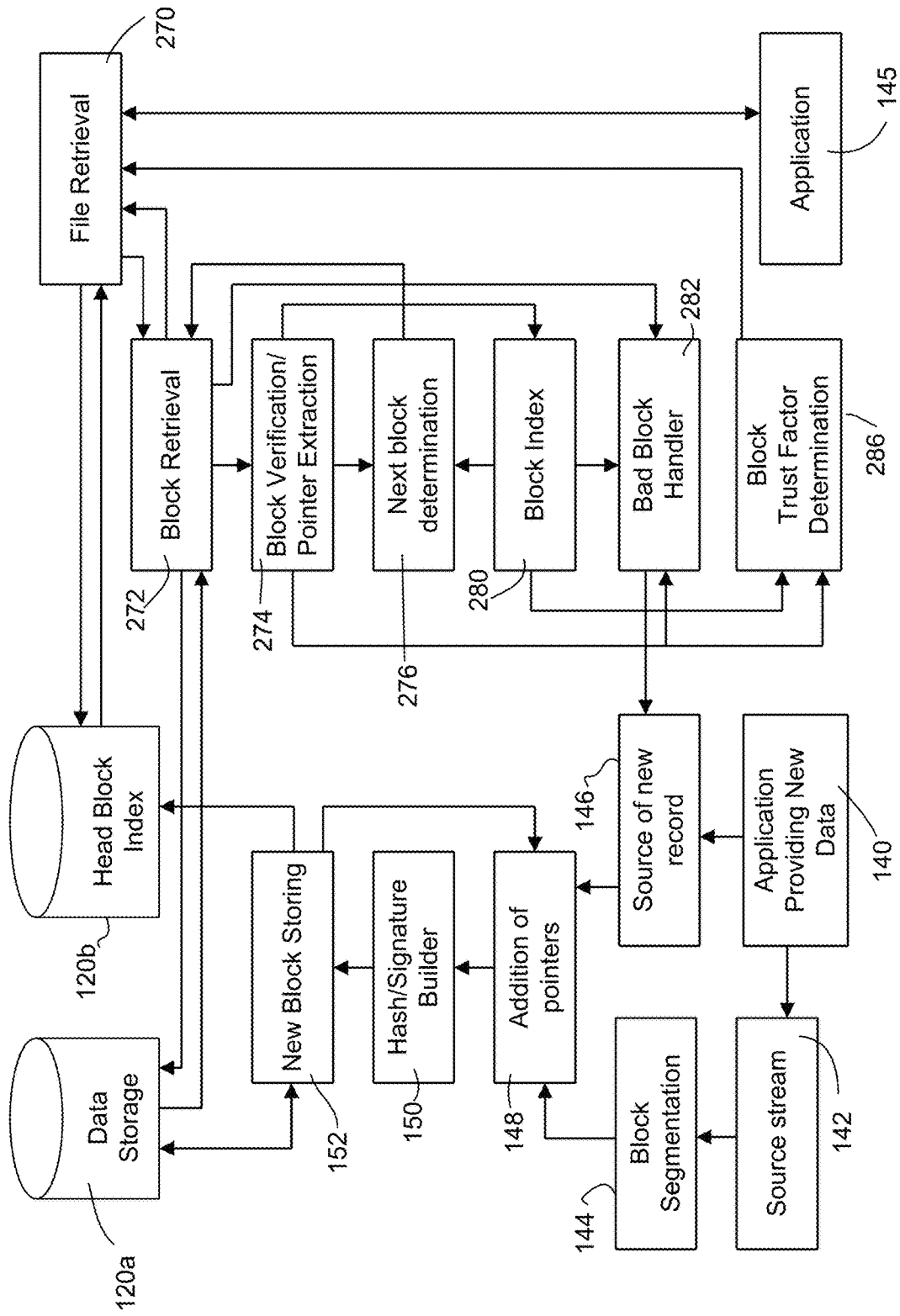
FIG. 2B is a block diagram of a system configured to store and retrieve data in a chain data structure according to one embodiment.

FIG. 2B illustrates schematically system components of the system of FIG. 1. In the embodiment of FIG. 2B, the blocking and storing of blocks in the chain is performed at the server 110, while the processing of the blocks for reading the data is performed at the client side such as at one of the devices 145, 150, 160 or 170. It will be understood that these operations can be entirely performed at the server 110 or client side, or distributed differently within the network as desired. In particular, the application that is the source of the new data file or stream 140 is illustrated as being at the server 110. When the server is a video archive server or video management server, the application 140 is the process that handles an incoming video camera stream to be stored on the server 110. It will be understood that this application or process can likewise be at a different node in the network. In more general terms, the new data can be a file data or stream data. In some cases, the new data is a newer version of data file. Accordingly, new file data can be provided as a source of a new record 146, while in the case of a stream, it can be added to a source stream 142. In the case of the stream, module 144 determines how the stream should be broken up into blocks of payload data. For the security of the block chain data structure, the pointer (e.g. the hash value, a unique identifier or a storage location or filename) of the latest previous block in the chain is encoded into the current block at module 148 and given its desired encoding or structure. The hash value can be calculated using a variety of known cryptographic hash functions. For example the hash value can be what is called collision resistant, namely it is hard to find two inputs that hash to the same output. The pointer to a non-immediate prior block can also be included in the block by the hash/signature builder module 150. This additional pointer data can be provided for every block or only for some blocks, such as for every 'n' blocks where 'n' is a fixed integer or a random integer as desired. The non-immediate prior block pointer can be distanced from the current block by any desired number, for example from 2 to 16, or more. The block can be digitally signed in module 150. The digital signing of a block in a blockchain is well-known in the art. Module 152 then stores the block in the block storage 120*a*, while the Head Block Index 120*b* is updated for the file with the location of the current head block.

The components involved in retrieving of blocks from the stored chain data structure are also shown in FIG. 2B. A user or an application 145 initiates a request to access the file or stream from a file retrieval module 270. Module 270 accesses the head block index 120*b* to obtain the storage location for the head block. If the block index for the stored chain data structure is already known (e.g. stored in block index 280), then traversing the chain from the header block to the genesis block to build an index is not required. In this case, the file retrieval module 270 can direct the retrieval module 270 to begin retrieving blocks starting from any desired block in the index in a forward or backward direction. When the index is not already determined, the storage location of the header block is passed to the block retrieval module 272 that retrieves the head block data from storage 120*a*. When module 272 encounters an error due to the block not being found or not being readable, an error message identifying the block can be passed to a bad block handler 282 whose function is described in greater detail below. When module 272 successfully retrieves the block, module 274 performs verification of the hash value and, when applicable, extracts the pointer or pointers to prior blocks. Non immediate prior block pointers are passed to the block index module 280, while the prior block pointer is used by the block determination module 276 that confirms if the next prior block is a bad block that needs to be skipped or if it is to be retrieved as the next prior block. This process continues until the chain of blocks have been traversed and the index is built. During this traversal, the contents of the blocks can be collected and returned to the file retrieval module 270 for the application 145 to use. Alternatively, the chain of blocks is traversed to build the index, so that with the index completed, the file retrieval can operate to retrieve any range of blocks in a forward or backward direction as desired.

Bad block handler 282 responds to a corrupt block being detected by the block retrieval module 272 or the block verification module 274. Handler 282 can alter the block index and it can add a new block to the head of the chain to inform that the discovered existing bad block(s). This new block, when read in the future, will allow the index to be built correctly, while allowing modules 272 and 274 to avoid rediscovering the bad block(s).

The block trust factor determination module 286 performs the calculation of the trust factor for the currently retrieved block and communicates this to the file retrieval module 270. The trust factor can be added as metadata encoded in the file given to the application 145, or it can be provided as a separate channel of data. The trust factor of a given block can be the number of later blocks that point to the given block with validated hash functions. When the chain is broken due to corrupt data, the alternative chain path provided by the non prior block pointer is used to provide the given block with a higher than otherwise trust value when one of the later blocks is corrupted, while there are still later blocks connected to the given block by the non prior block pointer. As a simple example of calculating the trust factor, the alternative chain path provided by the non prior block pointer can be given equal weight as the regular chain not having any corrupt blocks.

Figure 3:
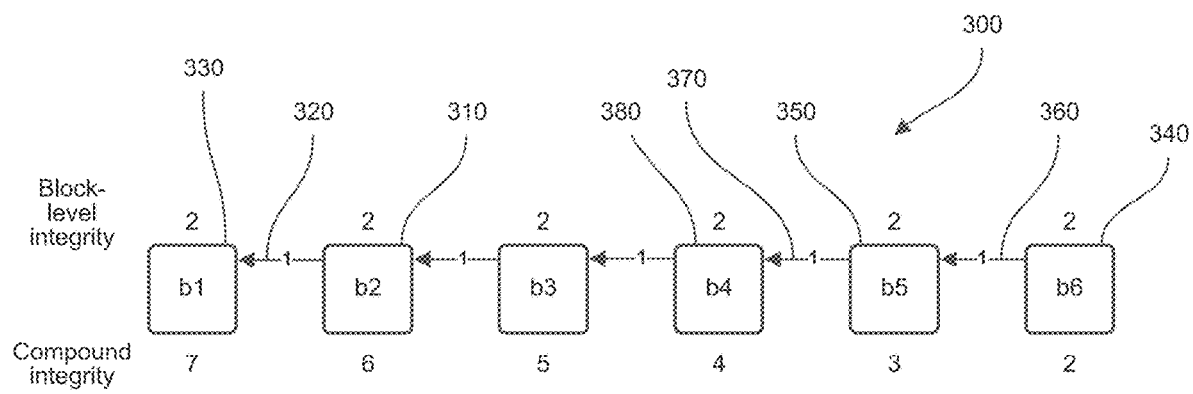
FIG. 3 is a diagram showing a chain data structure formed by sequential blocks, each block having an ancestor pointer directed to a prior block.

FIG. 3 is a diagram showing a chain data structure 300 formed by sequential blocks, each block (e.g., 310) having an ancestor pointer (e.g., 320) directed to a prior block (e.g., 330). In this example, each block has a single ancestor pointer which is directed to an immediately preceding block. In such a case, the ancestor pointer is considered to have a distance of one (as indicated by the numeral "1" on the line representing the pointer), because the block it is directed to is one block away in the chain, e.g., block b2 (310) has an ancestor pointer 320 which is directed to block b1 (330). In implementations, the ancestor pointers are implemented as hash pointers which comprise a hash obtained from the header of the block, which may be the hash of the payload data from the block, to which they are directed.

Each block in the chain data structure has an associated local, i.e., block-level, integrity level (see numeral above each block) characterizing the relative strength of data integrity of the block itself. A set of integrity levels may be defined specifying particular data integrity requirements, such as requirements relating to digital signatures and data format. Based on these defined levels, a specific integrity level is assigned to each block. Each defined integrity level necessarily incorporates the requirements of all lower integrity levels. The following is an example of a set of defined block-level integrity levels:

Level 0: The block exists, is in the proper data format, and is claiming to be part of a particular chain.
Level 1: The block signature is cryptographically valid.
Level 2: The block is signed by an identity who is authorized to contribute to the particular chain.

A minimum block-level integrity level may be specified as a requirement for the chain data structure. For example, a minimum block-level integrity of level 2 may be required for all blocks in the chain data structure. In the example depicted, all of the blocks have a block-level integrity level of 2 (see numeral "2" above each block), which meets the minimum requirements and, consequently, all of the blocks are considered by the system to be trusted blocks.

Because the chain data structure is retrieved sequentially, the integrity level of a particular block has a compound, i.e., cumulative, effect on the integrity of other blocks in the chain. For example, block b4 (380) is referenced by an ancestor pointer 370 of block b5 (350), which may be referred to as an "inbound pointer" with respect to block b4. Block b5, in turn, is referenced by an ancestor pointer 360 of block b6 (340), which is an inbound pointer with respect to block b5. The blocks traversed from block b4 along a chain of inbound pointers in the direction toward the end of the chain data structure 300 (i.e., in a direction opposite to the ancestor pointer referencing block b4), which in this case would be blocks b5 and b6, act as sort of a gatekeeper for block b4, because they are retrieved before block b4 is retrieved. Therefore, block b4 is deemed to have a compound integrity level which is the sum of its block-level integrity level of two and a "compounding value" obtained by following a path along inbound pointers (i.e., in a direction opposite to the direction of the ancestor pointer referencing block b4) to reach the end of the chain.

In the example depicted in FIG. 3, block b4 (380) has a compounding value which is obtained by following a path along inbound pointers, i.e., a path which passes from block b4 to block b5 via a first ancestor pointer 370 and from block b5 to block b6 via a second ancestor pointer 360. The compounding value in this example is two, because two blocks (b5 and b6) are traversed in the path from block b4 to the end of the chain (block b6 is considered to be "traversed" because it is a block which would be retrieved prior to block b4). To be a valid determination of compound integrity, all of the blocks in the followed path (including the subject block itself) must have a block-level integrity level greater than or equal to the minimum required by the system, i.e., a block-level integrity of two or greater. Thus, in the example depicted, block b4 has a compound integrity level of 4, which is its block-level integrity level plus a compounding value of two for traversing blocks b5 and b6 to reach the end of the chain. In implementations, the path followed from a block to the end of the chain may be a forked path, in which case an integrity level value would be determined for each path.

The compound integrity of the blocks of a chain can be used to determine an integrity level for the chain as a whole. For example, a chain integrity level may be determined based on the compound integrity levels of the blocks constituting the chain, e.g., by determining an average value or, alternatively, a minimum value of the compound integrity levels of the blocks. Different chain integrity levels may be specified for different use cases, because consumers of data may require different levels of assurance with respect to the integrity of the data they are consuming. For example, video footage being used in a court room might require a higher chain integrity level than footage being used to check historical traffic conditions along a highway for use in a predictive algorithm.

Figure 4:
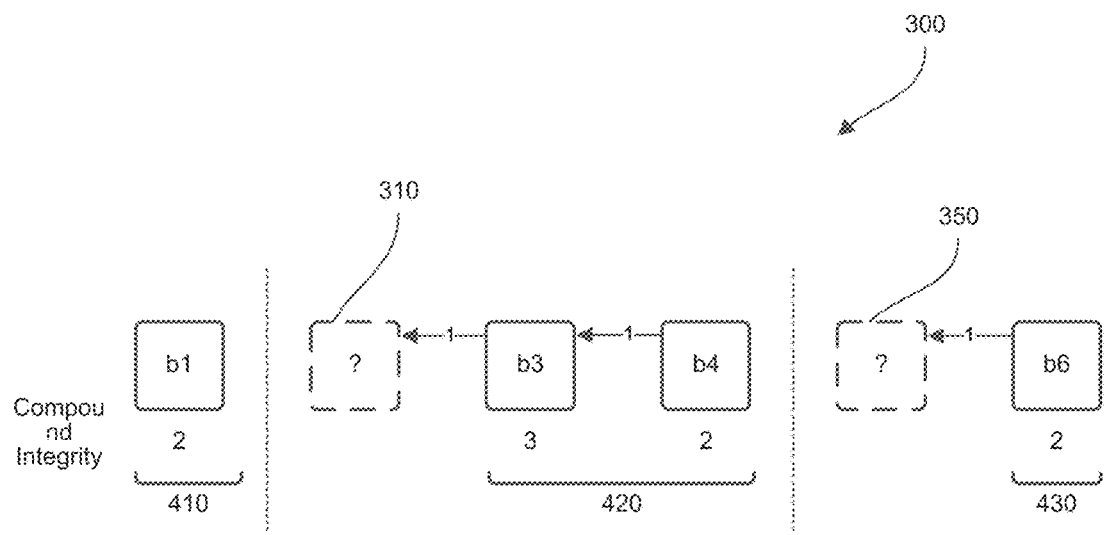
FIG. 4 is a diagram showing the chain data structure of FIG. 3 in which one or more blocks are missing.

FIG. 4 is a diagram showing the chain data structure 300 of FIG. 3 in which one or more blocks are missing. Specifically, block b2 (310) and block b5 (350) are missing because, for example, these blocks were lost in transmission to the system 100, in the process of being stored, or in the process of being retrieved. Consequently, the respective ancestor pointers of these blocks (see FIGS. 3, 320 and 370) are not available for use in connecting the remaining blocks of the chain data structure 300 (i.e., blocks b1, b3, b4, and b6). The loss of blocks b2 and b5, and their respective pointers, results in three disjoint sets of blocks: a first set 410 containing block b1, a second set 420 containing blocks b3 and b4, and a third set 430 containing block b6. Blocks b1 and b6 have a compound integrity equal to their block-level integrity level, i.e., two, because there are no connected blocks to contribute a compounding value. Block b3, on the other hand, still has the benefit of having block b2 connected and therefore has a compound integrity of three—the sum of the block-level integrity level of two and a compounding value of one to account for traversing block b2 in a path followed along inbound pointers (i.e., in a direction opposite to the direction of the ancestor pointer referencing block b3) to the end of the chain.

Figure 5:
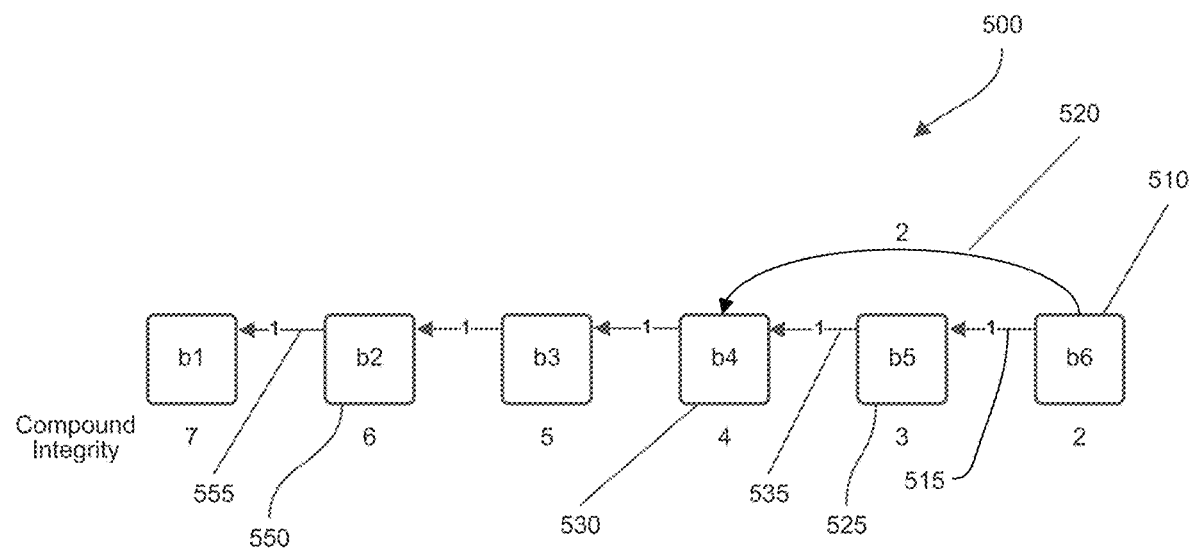
FIG. 5 is a diagram showing a chain data structure formed by sequential blocks, each block having a plurality of ancestor pointers to prior blocks.

FIG. 5 is a diagram showing a chain data structure 500 formed by sequential blocks, each block (e.g., 510) having a plurality of ancestor pointers (e.g., 515 and 520) to prior blocks (e.g., 520 and 530). In this example, each block (e.g., 510) has a first ancestor pointer (e.g., 515) which is directed to an immediately preceding block (e.g., 525) and at least a second ancestor pointer (e.g., 520) which is directed to a prior block (e.g., 530) which is further back than the immediately preceding block. The exceptions to this are blocks near the beginning of the chain, e.g., blocks b1 and b2, which have no pointer and one pointer, respectively. The first ancestor pointer (e.g., 515) is considered to have a distance of one (as indicated by the numeral "1" on the line representing the first pointer), because the block it is directed to is one block away in the chain, e.g., block b6 (510) has a first ancestor pointer 515 which is directed to block b5 (525). The second ancestor pointer (e.g., 520) is considered to have a distance of two (as indicated by the numeral "2" on the line representing the second pointer), because the block it is directed to is two blocks away in the chain, e.g., block b6 (510) has a second ancestor pointer 520 which is directed to block b4 (530). In the absence of a discontinuity in the chain data structure 500, the shortest distance pointer (e.g., 515) would be used when retrieving the blocks to maintain the proper sequence of blocks to form the total order of the blocks.

As discussed above with respect to FIG. 3, each block in the chain data structure has an associated block-level integrity level characterizing the relative strength of data integrity of the block itself and a compound integrity level. For this example, it will be assumed that all of the blocks have a block-level integrity level of two, which is the minimum requirement of the system 100. This means that the blocks are in the proper data format and claim to be part of a particular chain, and the block signatures are cryptographically valid and are signed by an identity who is authorized to contribute to the particular chain. The compound integrity levels are determined, as described above, by following a path along inbound pointers (i.e., in a direction opposite to the direction of the ancestor pointers referencing the subject block) to reach the end of the chain.

As an example, block b4 (530) is referenced by two ancestor pointers, which inbound pointers with respect to block b4. The inbound pointers to block b4 are: (i) an ancestor pointer 535 from block b5 (525); and (ii) an ancestor pointer 520 from block b6 (510). In the absence of a discontinuity in the chain data structure 500, the shortest distance pointer (e.g., 535) would be used when retrieving the blocks to maintain the proper sequence of block b6 to block b5 to block b4. Thus, a path is followed which passes to block b5 via an ancestor pointer 535 and to block b6 via a second ancestor pointer 515, both ancestor pointer being the same distance. The compounding value obtained in this example would be two, because two blocks (b5 and b6) are traversed in the path from block b4 to the end of the chain (block b6 is considered to be "traversed" because it is a block which would be retrieved prior to block b4). To be a valid determination of compound integrity, all of the blocks in the followed path must have a block-level integrity level greater than or equal to the minimum required by the system, i.e., a block-level integrity of two or greater. Thus, in the example depicted, block b4 would have a compound integrity level of 4, which is its block-level integrity level plus a compounding value of two for traversing blocks b5 and b6 to reach the end of the chain.

Figure 6A:
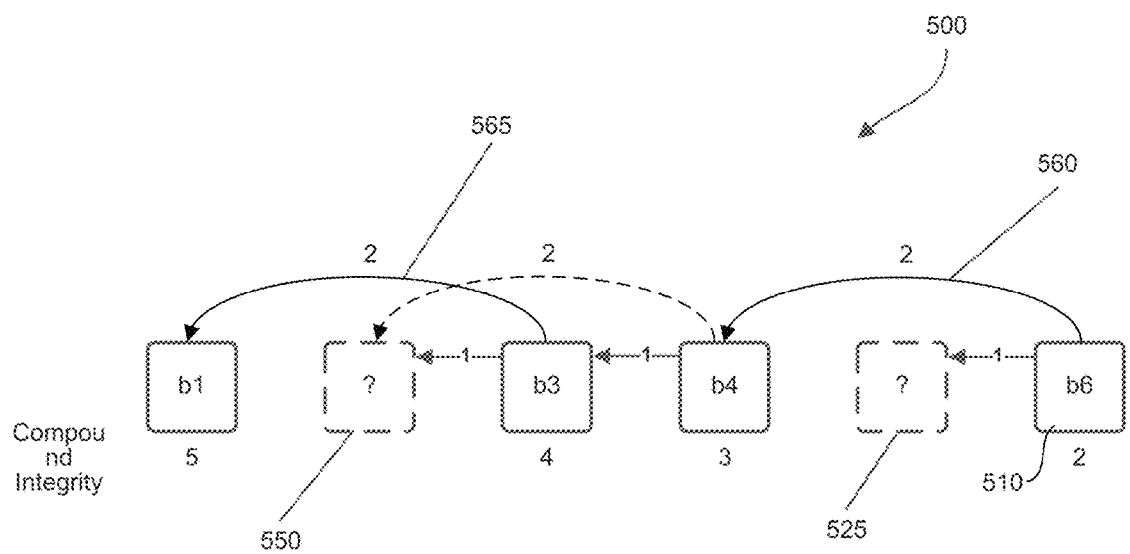
FIG. 6A is a diagram showing the chain data structure of FIG. 5, in which one or more blocks are missing.

FIG. 6A is a diagram showing the chain data structure 500 of FIG. 5 in which one or more blocks are missing. As in the example of FIG. 4, discussed above, block b2 (550) and block b5 (525) are missing because, for example, these blocks were lost in transmission to the system 100, in the process of being stored, or in the process of being retrieved. Consequently, the respective ancestor pointers of these blocks (see FIGS. 5, 555 and 535) are not available for use in connecting the remaining blocks of the chain data structure 500 (i.e., blocks b1, b3, b4, and b6).

In the example of FIG. 4, because each block had only a single ancestor pointer directed to an immediately preceding block, the loss of blocks b2 (310) and b5 (350), and their respective pointers, resulted in three disjoint sets of blocks. By contrast, as shown in FIG. 6A, a connection is maintained between block b6 and block b4 via the second ancestor pointer 560 of block b6. In a similar manner, a connection is maintained between block b3 and block b1 via the second ancestor pointer 565 of block b3. Thus, storing multiple ancestor pointers of varying distances allows for the chain data structure to remain intact even if blocks are lost, depending on how many blocks are lost and their relative positions in the chain. In the example of FIG. 6A, if two or more consecutive blocks were lost, then disjoint sets of blocks would be formed. In implementations, a block may have multiple ancestor pointers, e.g., four, of varying lengths, e.g., 1, 3, 5, and 19. In such a case, a greater number of blocks, including consecutive blocks, can be lost without resulting in a disjoint chain.

In the example of FIG. 4, blocks b1 and b6 had a compound integrity equal to their block-level integrity level, i.e., two, because there were no connected blocks to contribute a compounding value. Block b3 still had the benefit of having block b2 connected and therefore had a compound integrity of three, which is the sum of the block-level integrity level of two and a compounding value of one to account for traversing block b2 in a path followed along inbound pointers (i.e., in a direction opposite to the direction of the ancestor pointer referencing block b3) to the end of the chain. By contrast, in the example of FIG. 6A, significantly higher values of compound integrity were maintained. For example, block b1 has a compound integrity of 5 in the example of FIG. 6A, versus 2 in the example of FIG. 4.

Figure 6B:
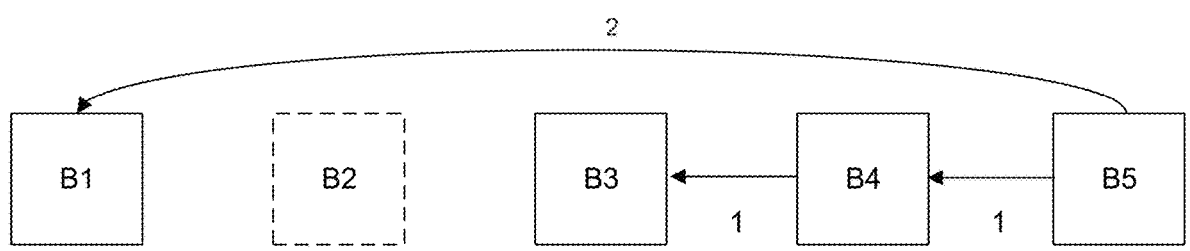
FIG. 6B is a diagram of a chain of five blocks in which the second block is lost with the fifth block having an additional pointer to the first block.

In the example of FIG. 6B, five blocks, B1 through B5 are in a broken chain because block B2 is missing, however, block B5 contains an additional pointer to block B1. To find the tail block for B4 by only following outbound pointers, B3 is at a distance of 1. Whereas if inbound pointers are also considered, B1 is correctly found at a distance of 3. The algorithm follows the outbound and inbound pointers in two passes.

First the algorithm tries to find the tail block using only outbound pointers which yields the following table:

Direct Tail Blocks:

| Block | Tail | Distance |
|-------|------|----------|
| B1    | B1   | 0        |
| B3    | B3   | 0        |
| B4    | B3   | 1        |
| B5    | B1   | 4        |

A second pass follows the inbound pointers recursively. In this pass, the map of "Inferred Tail Blocks" is obtained.

For example, for block B3 inbound pointer B4 is at distance 1 so one can recursively ask what the inferred tail block for B4 is. B4 has inbound pointer B5 so one can ask B5. B5 has no inbound pointers so the result for B4 is the same as the direct one so one can look up B5 in the initial map and return that value. (B1, 4)

B4 then subtracts 1 from the distance between B1 and B5 since that is the distance between B4 and B5. So it finds that it has B1 as a potential ancestor at a distance of 3. Since this is better than its directly located tail which had a distance of 1, it returns (B1, 3) instead of (B3,1).

Finally B3 again subtracts one getting a candidate of (B1, 2) which is also better than what it had from the first pass and so this is what it uses.

Inferred Tail Blocks:

| Block | Tail | Distance |
|-------|------|----------|
| B1    | B1   | 0        |
| B3    | B1   | 2        |
| B4    | B1   | 3        |
| B5    | B1   | 4        |

It will be appreciated from this example that finding the inferred tail for B3 involved finding the inferred tail for all of the blocks that follow B3 (hence the recursive aspect) so practically speaking the implementation updates the "Inferred tail" map as it goes along so as to avoid duplicating work. A similar optimisation is performed for the first pass as well.

The reason the algorithm runs in two passes and not in a single pass is that one would risk looping indefinitely if one followed both directions of pointers at once rather than only following one direction and optionally having a lookup table for the results in the other direction.

Figures 7, 8:
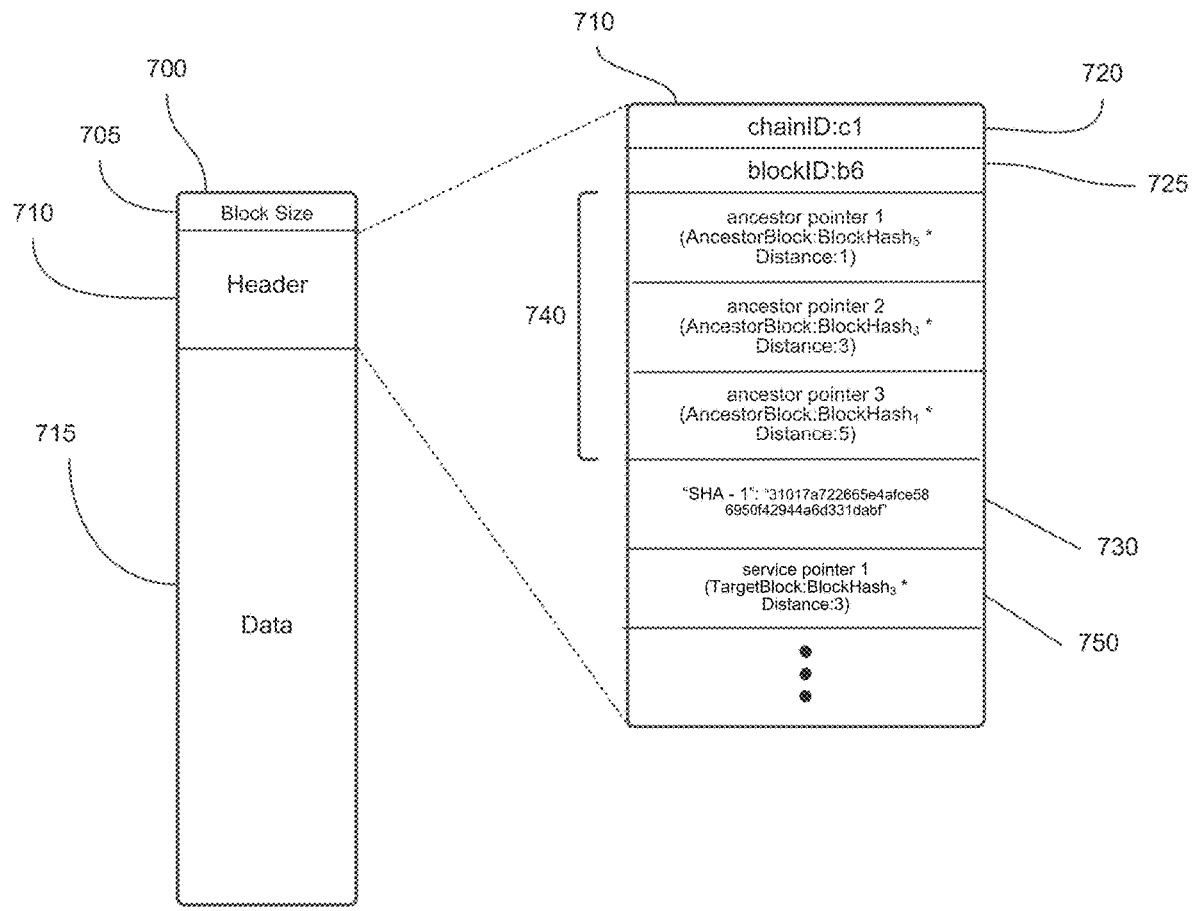
FIG. 7 is a diagram showing the structure of a sequential block of a chain data structure.
FIG. 8 shows an index to retrieve data from a chain data structure containing sequential blocks having one or more ancestor pointers.

FIG. 7 is a diagram showing the structure of a sequential block 700 of a chain data structure. In a chain data structure, data is stored in a plurality of sequential blocks 700, which are data structures having a header 710 and a payload 715 which stores data. The header 710 provides information to facilitate the storage, retrieval, transmission, and reception of the block 700 and processing of the data in the payload 715. In implementations, the block 700 may have an initial portion which contains information on block size 705.

As shown in the enlargement of the header on the right-hand side of FIG. 7, the header includes a chainID 720 identifying to which chain the block 700 belongs, e.g., chain c1. As discussed above, the data storage 120 (see FIG. 1) may store the blocks of a multitude of chains in a common data store. The header includes a blockID 725 which identifies the block 700, e.g., block b6, within the chain identified by the chainID 720. The header includes a digital signature 730, such as an SHA-1 hash, which may be the hash of the data payload 715. As explained above, the system 100 specifies a minimum requirement for block integrity which requires the block to be signed by an identity who is authorized to contribute to the particular chain containing the block.

The header further includes one or more ancestor pointers 740 which, as discussed above, reference prior blocks in the chain by, e.g., storing a hash of the header of the block being referenced. Each ancestor pointer 740 also specifies a distance which gives the relative position of the prior block being referenced, e.g., a distance of one for the immediately preceding block, a distance of three for the third block counting back from the current block 700, etc. In the example depicted, there are three ancestor pointers but the number can vary depending on the requirements of the system 100. Having a larger number of pointers increases the probability of being able to reconstruct the sequence of blocks forming a chain, but also increases the size of the header and the processing requirements for retrieval and storage. In this example, the first ancestor pointer points back with a distance of one to the immediately preceding block (e.g., block b5), the second ancestor pointer points back with a distance of three to the third-closest preceding block (e.g., block b3), and the third ancestor pointer points back with a distance of five to the fifth closest preceding block (e.g., block b1).

In this example, the header further includes one or more service pointers 750 which reference prior blocks in the chain by, e.g., storing a hash of the header of the block being referenced, in a manner akin to the ancestor pointers 740. As discussed in further detail below, a service pointer 750 is optionally used to point to a prior block which is to be processed by a service which performs various editing and utility operations on a target block. In the example depicted, the service pointer points back with a distance of three to the third-closest preceding block (e.g., block b3), which is the target block for the editing/utility operation. The header 710 may vary from that depicted in FIG. 7 depending on practical implementations.

The data carried in the payload 715 of the block 700 may be, for example, data from a video stream. In such a case, each chain may be used to store a different video stream, which is a logical entity that provides video frames coming from a single source (e.g., camera, microphone, GPS, etc.) over all the streaming time. It is made of segments from a unique source, where none of the segments overlap. A video stream may be characterized as boundless and purely accretive by nature, i.e., new data is always appended at its end, existing data is never modified. The video stream contains data that varies as a function of time (e.g., streaming time) and can be arbitrarily divided into finite segments which are immutable (i.e., their data will never change). A segment is a logical entity that contains a finite subset of the data (e.g., a finite number of frames) composing a video stream. A segment has a start time and an end time. Typically, a segment corresponds to a file stored on disk and several segments are used to compose an elementary stream. The payload 715 of a particular block 700 may store one or more segments of video data.

FIG. 8 shows an index to retrieve data from a chain data structure containing sequential blocks having one or more ancestor pointers. As discussed in further detail below, the index is a database table generated from an arbitrary set of stored blocks with no information other than the blocks themselves. It is used by applications to retrieve data from the chain data structure in the proper sequence. The example depicted is an index which would be used to retrieve data from a chain data structure such as those shown in FIGS. 3 and 5. The index lists all of the blocks of the chain, i.e., the blocks which are currently available to be indexed. For each block (e.g., block b1-03), the index provides a blockID of a previous block (i.e., the immediately preceding block), the distance to the previous block (i.e., a block count to reach the previous block if all blocks are present), the next block (e.g., block b1-04), the distance to the next block, and the compound integrity. As explained above, the compound integrity depends on the number of blocks between the current block and the end of the chain, so the compound integrity of the blocks will change as each new block is added to the chain. Therefore, in implementations, the compound integrity may be stored in a manner other than a database table. The index shown in FIG. 8 may be generated when the chain c1 is created and may be updated each time a block is added to the chain c1, may be generated in response to detection of a partial data loss or corruption, or at any other suitable time when the order of the blocks and/or compound integrity is desired to be obtained.

Figure 9A:
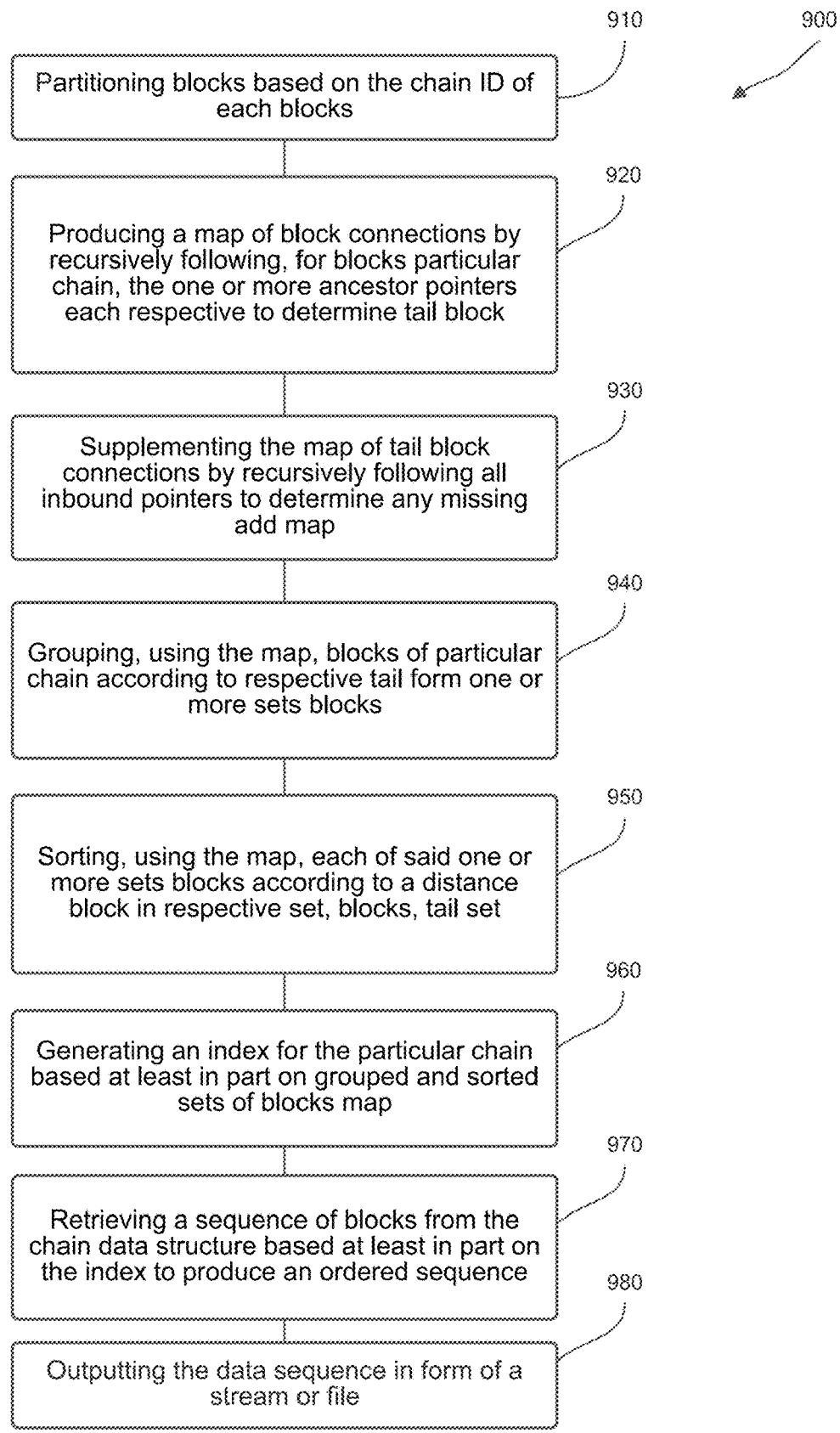
FIG. 9A is a flowchart for a method of retrieving data from a chain data structure comprising one or more chains, according to one illustrated embodiment.

FIG. 9A is a flowchart for a method 900 of retrieving data from a chain data structure comprising one or more chains. Each of the chains comprises a plurality of sequential blocks, each block having a chain identifier (ID) and one or more ancestor pointers. Each of the one or more ancestor pointers identifies a prior block in the chain data structure. The method 900 may be implemented using a data management system such as the system described herein.

As discussed above, the data storage 120 (see FIG. 1) may store the blocks of a multitude of chains in a common data store. According to the method 900, the blocks are partitioned based on the chain ID of each of the blocks (910). A map of tail block connections is produced by recursively following, for blocks of a particular chain, the one or more ancestor pointers of each respective block to determine a respective tail block (920). The respective tail block is a block having a greatest distance value relative to the respective block from among one or more blocks connected to the respective block. The distance value is given by a sum of one or more intermediate distance values along one or more ancestor pointers on a path between the respective block and a respective one of the one or more blocks connected to the respective block. In the examples of FIGS. 3 and 5, block b1 is the tail block.

The map of tail block connections is supplemented by recursively following, for the blocks of the particular chain, all inbound pointers to determine tail block connections which are not already included in the map to add to the map of tail block connections (930). The blocks of the particular chain are grouped, using the map, according to the respective tail blocks of the respective blocks to form one or more sets of blocks (940). Each of said one or more sets of blocks is sorted, using the map, according to a distance of each block in a respective set, of said one or more sets of blocks, to a respective tail block of the respective set (950). An index for the particular chain is generated based at least in part on the grouped and sorted sets of blocks of the map (960). A sequence of blocks for the particular chain is retrieved from the chain data structure based at least in part on the index to produce a data sequence (970), and the data stream is output in the form of a data stream or data file (980), e.g., to the data management workstation 130 (see FIG. 1) to be displayed or transmitted to user devices via the network 125 (see FIG. 1).

FIG. 9B is a flowchart for an exemplary method of handling missing or corrupted data from a chain data structure, such as may be done by the Bad Block Handler module (282) detailed in FIG. 2B. The bad block handler logic may begin (981) by a request from the block index module (280). Once initialized, the bad block handler may determine whether a block is missing in the chain or whether a block is corrupted (983). The module may determine that a block is missing upon receiving a signal (985) from the block retrieval module and may thereafter validate that the block is not found in the data storage (120*a*). The bad block handler may thereon search the index for the next known block (987) and create an exception in the index for pointers referring to the missing block to be substituted by a pointer referring to the next known block (989). The handler may optionally add a new block to the chain to memorialize the missing block and the modification to the pointers now referring to the next known block (991).

When receiving a signal from the block verification and pointer extraction module (274) that a block has been verified and deemed corrupted (993), the bad block handler may add a new block to the chain to memorialize the corruption of the block (995). As the data from this corrupted block is not missing, subsequent blocks may retain their pointers to the corrupted block. However, the added block memorializing the corruption may be used when investigating data corruption and/or as an advisory marker to a user retrieving the corrupted block.

Figure 9C:
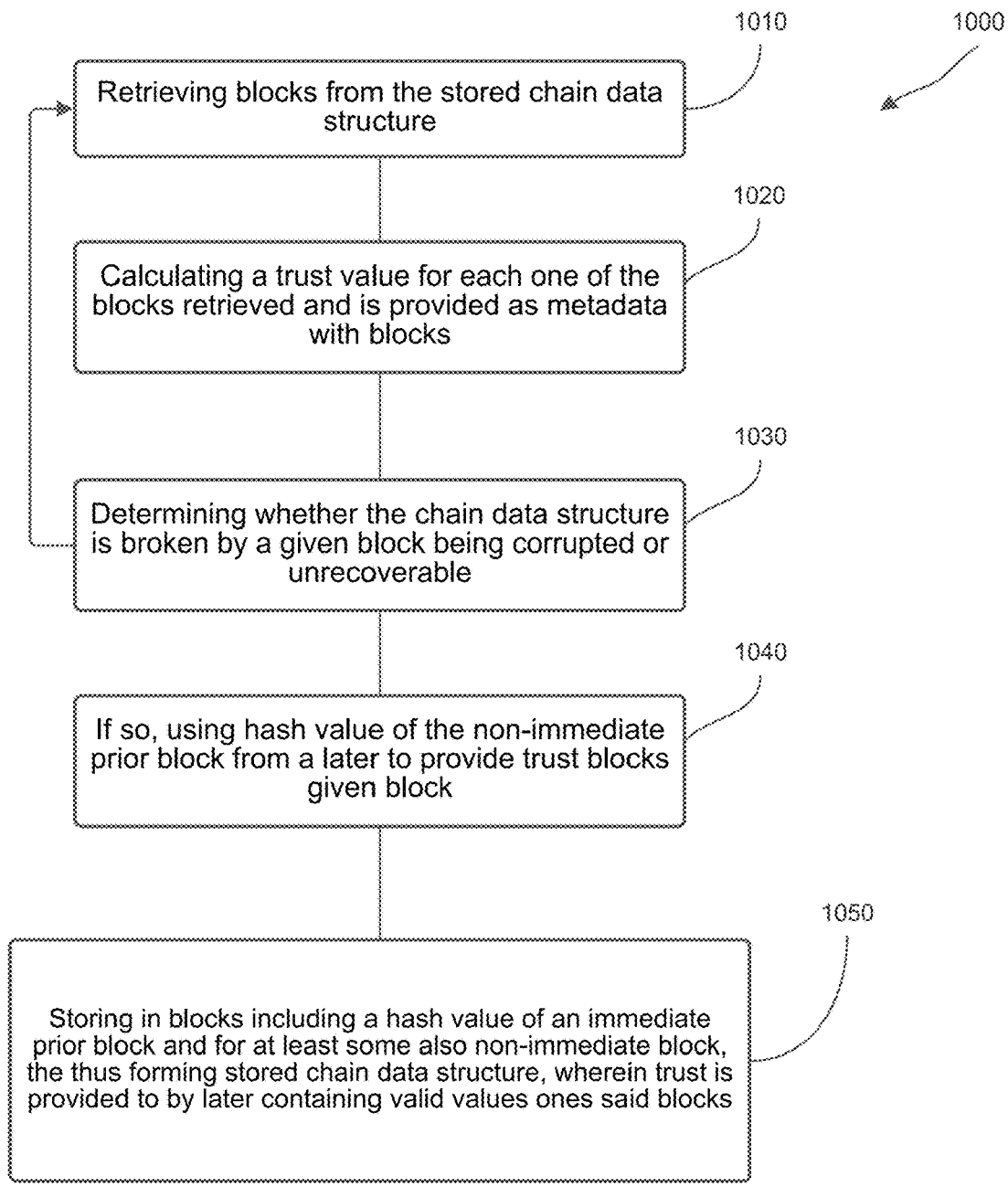
FIG. 9C is a flowchart for a method of retrieving data in a chain data structure stored in blocks including a hash value of an immediate prior block and for at least some blocks also including a hash value of a non-immediate prior block.

FIG. 9C is a flowchart for a method 1000 of retrieving data in a chain data structure stored in blocks including a hash value of an immediate prior block and for at least some blocks also including a hash value of a non-immediate prior block, the blocks thus forming a stored chain data structure, wherein trust or integrity can provided to blocks in the chain by later blocks containing valid hash values of prior blocks including valid ones of said hash values of non-immediate prior blocks.

The method 1000 includes retrieving blocks from the stored chain data structure (1010). In embodiments, a trust value is calculated for each one of the blocks retrieved and, optionally, is provided as metadata with the blocks (1020). A determination is made as to whether the chain data structure is broken by a given block being corrupted or unrecoverable (1030). If so, the hash value of the non-immediate prior block from a later block is used to provide trust to blocks prior to the given block. (1040). If not, the retrieval of blocks continues. In embodiments, the method 1000 further includes storing in blocks (1050) including a hash value of an immediate prior block and for at least some blocks also including a hash value of a non-immediate prior block, the blocks thus forming a stored chain data structure, wherein trust is provided to blocks in the chain by later blocks containing valid hash values of prior blocks including valid ones of said hash values of non-immediate prior blocks.

While the trust value may be calculated for each block and it may be stored as metadata associated with each block, the trust value may be determined across a chain of blocks with which the trust value is associated. While the trust value may represent multiple levels of trust, for example using a scalar variable, the trust value may also be a Boolean variable indicating that the block or chain of blocks is trusted or untrusted.

Figure 9D:
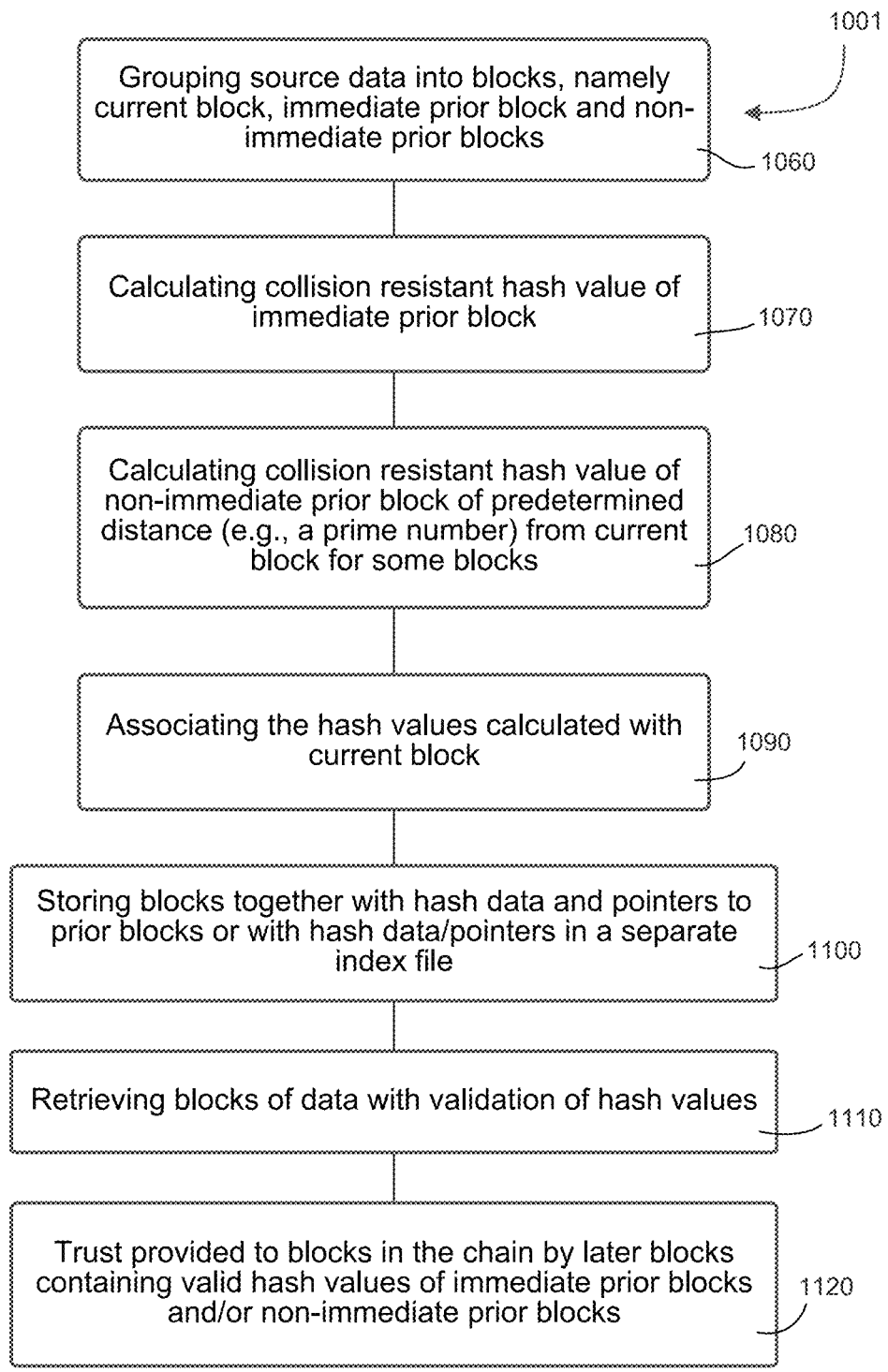
FIG. 9D is a flowchart of a method of storing data in a chain data structure including grouping source data into blocks according to one illustrated embodiment.

FIG. 9D is a flowchart of a method 1001 of storing data in a chain data structure. The method includes grouping source data into blocks (1060). The blocks may be of a specified length or of a variable length. As described above, hash values are calculated (1070). Hash values can be calculated on the prior block (1080) and the hash values of prior blocks associated with the block (1090). As described above, for some blocks, a hash value is also calculated for non-immediate prior blocks. The hash value of the immediate prior block and any hash value of the non-immediate prior block can then be stored (1100) with the block data itself or in a separate index as desired. As described above, the stored block data can be retrieved (1110) and a validation of the hash values can be performed so that trust or integrity of the data can be ascribed to the data (1120).

The following is an exemplary code in F #for an implementation of the methods described herein. A person skilled in the art will appreciate that the code included herein is for illustrative purposes only and that the implementation of the methods described herein may be equivalently done through other codes.

```
module Model =
    type BlockId = BlockId of string
    type ChainId = ChainId of string
    type BlockPointer = {Block: BlockId; Distance: int} // block * distance
    type Block = { Chain: ChainId; Id: BlockId; Ancestors: BlockPointer list }
    type IndexTableRow =
        {
            Chain: ChainId
            Block: BlockId
            Previous: BlockPointer option
            Next: BlockPointer option
            Integrity: int
        }
```

```
        type IndexTable = IndexTableRow list
module Indexing =
    open Model
    //just some extensions on Seq
    module Seq =
        let hasAny a = (Seq.tryHead a).IsSome
    //just some extensions on Map
    module Map =
        let keys? 'K, 'V> = Seq.map (fun (KeyValue (k: 'K, _: 'V) ) -> k)
        let values? 'K, 'V> = Seq.map (fun (KeyValue ( _: 'K, v: 'V) ) -> v)
        let asTuples< 'K, 'V> = Seq.map (fun (KeyValue (k: 'K, v: 'V) ) -> k, v)
    type private PointerSet = {Outbound: BlockPointer list; Inbound: BlockPointer list}
    //this would, validate the format, check the signature etc
    let CheckBasicIntegrity (b:Block) = 2
    //walk all pointers recursively to find the furthest block
    let rec private forwardPass (result:Map<BlockId, BlockPointer>) (getPointers:BlockId -
> BlockPointer list) (toProcess:BlockId list) =
        let rec trim 1st =
            match 1st with
            | [ ] -> [ ]
            | h::tail -> if Map.containsKey h result then trim tail else 1st
        match trim toProcess with
        | [ ] -> result
        | bId::tail as remaining ->
            match getPointers bId with
            | [ ] ->
                let result = result | > Map.add bId { Block=bId; Distance = 0 }
                forwardPass result getPointers tail
            | ptrs ->
                let missing =
                    ptrs
                    | > Seq.where (fun p -> not (Map.containsKey p.Block result) )
                    | > List.ofSeq
                match missing with
                | [ ] -> // failwith ""
                    let furthest =
                        seq {
                            yield { Block=bId; Distance = 0 } // current tail value
                            yield!
                                ptrs
                                | > Seq.map (fun p ->
                                    let p' = result | > Map.find p.Block
                                    {Block = p' .Block; Distance = p' .Distance + p.Distance
})
                        }
                        | > Seq.sortByDescending (fun p -> p.Distance)
                        | > Seq.head
                    let result = result | > Map.add bId furthest
                    forwardPass result getPointers tail
                | m ->
                    let toProcess = m | > Seq.sortBy (fun p -
> p.Distance) | > Seq.fold (fun a e -> e.Block::a) remaining
                    forwardPass result getPointers toProcess
    // walk all inbound pointers recursively to check if they can offer a further block th
an the forward pass gave
    let rec private backwardsPass (result:Map<BlockId, BlockPointer>) (forwardPassResult:M
ap<BlockId, BlockPointer>) (getInboundPointers:BlockId -
> BlockPointer list) (toProcess:BlockId list) =
        let rec trim 1st =
            match 1st with
            | [ ] -> [ ]
            | h::tail -> if Map.containsKey h result then trim tail else 1st
        match trim toProcess with
        | [ ] -> result
        | bId::tail as remaining ->
            match getInboundPointers bId with
            | [ ] ->
                let result =
                    match forwardPassResult | > Map.tryFind bId with
                    | Some r -> result | > Map.add bId r
                    | None -> result | > Map.add bId { Block=bId; Distance = 0 }
                backwardsPass result forwardPassResult getInboundPointers tail
            | ptrs ->
                let missing =
                    ptrs
                    | > Seq.where (fun p -> not (Map.containsKey p.Block result) )
                    | > List.ofSeq
                match missing with
                | [ ] -> // failwith ""
```

```
                    let furthest =
                        seq {
                            yield forwardPassResult |> Map.tryFind bId |> Option.defaultVa
lue { Block=bId; Distance = 0 } // current tail value
                            yield!
                                ptrs
                                |> Seq.choose (fun p ->
                                    match result |> Map.tryFind p.Block with
                                    | Some p' when p' .Distance > p.Distance ->
                                        Some {Block = p' .Block; Distance = p' .Distance - p
.Distance}
                                    | _ -> None)
                        }
                        |> Seq.sortByDescending (fun p -> p.Distance)
                        |> Seq.head
                    let result = result |> Map.add bId furthest
                    backwardsPass result forwardPassResult getInboundPointers tail
                | m ->
                    let toProcess = m |> Seq.sortBy (fun p -
> p.Distance) |> Seq.fold (fun a e -> e.Block::a) remaining
                    backwardsPass result forwardPassResult getInboundPointers toProcess
    let private getAllFurthestPointersDirect blockIds pointerFunc =
        let unvisited = blockIds |> List.ofSeq
        forwardPass Map.empty pointerFunc unvisited
    let private getAllFurthestPointersInferred blockIds (pointerFunc:BlockId-
>PointerSet) =
        let allBlockIds = blockIds |> List.ofSeq
        let forwardPassResult = forwardPass Map.empty (fun b -
> (pointerFunc b).Outbound) allBlockIds
        backwardsPass Map.empty forwardPassResult (fun b -
> (pointerFunc b).Inbound) allBlockIds
    let private buildIndexForChain (blocks:Map<BlockId, Block> ) =
        let getExistingAncestors i =
            match blocks.TryFind i with
            | None -> [ ]
            | Some blk ->
                blk.Ancestors
                |> Seq.where ( fun a -> blocks.ContainsKey a.Block)
                |> List.ofSeq
        let reversePointerMap =
            blocks
            |> Map.keys
            |> Seq.collect (fun bId ->
                let b = blocks.[bId]
                [
                    for a in b.Ancestors |> Seq.where (fun a' -
> blocks.ContainsKey a' .Block) do
                        yield (a.Block, {Block = bId; Distance = a.Distance})
                ]
                )
            |> Seq.groupBy fst
            |> Seq.map (fun g -> fst g, snd g |> Seq.map snd |> List.ofSeq)
            |> Map.ofSeq
        let getPointerSet bId =
            { Outbound = getExistingAncestors bId; Inbound = reversePointerMap |> Map.tryF
ind bId |> Option.defaultValue [ ] }
        let tailBlockMap = getAllFurthestPointersInferred (blocks |> Map.keys) getPointerS
et
        let disjointSets =
            tailBlockMap
            |> Seq.groupBy (fun p -> p.Value.Block)
            |> Seq.map (fun (_, kvps) -> kvps |> Map.asTuples |> Map.ofSeq)
            |> List.ofSeq
        let doSet (set:Map<BlockId, BlockPointer>) : seq<IndexTableRow> =
            let ordered =
                set
                |> Seq.sortBy (fun p -> p.Value.Distance)
                |> Map.asTuples
                |> List.ofSeq
            let ixMap =
                [
                    for i in [0..ordered.Length-1] do
                        let bId = ordered.[i] |> fst
                        let block = blocks.[bId]
                        let next = if i < ordered.Length-
1 then Some {Block = fst ordered.[i+1]; Distance = (snd ordered.[i+1]).Distance - (snd ord
ered.[i]).Distance } else None
                        let prev = if i > 0 then Some {Block = fst ordered.[i-
1]; Distance = (snd ordered.[i]).Distance - (snd ordered.[i-1]).Distance } else None
```

```
                         yield { Block = bId; Chain = blocks.[bId].Chain; Integrity = Check
BasicIntegrity block; Next = next; Previous = prev }
                    ]
                    | > Seq.map (fun r -> r.Block, r)
                    | > Map.ofSeq
                let getIntegrityPointer bId =
                    let getIntegrityContribution b =
                        match ixMap | > Map.tryFind b with
                        | Some r -> if r.Integrity >= 2 then 1 else 0
                        | None -> 0
                    match reversePointerMap | > Map.tryFind bId with
                    | Some p ->
                        p
                        | > Seq.map (fun i -
> { i with Distance = getIntegrityContribution i.Block } )
                        | > List.ofSeq
                    None -> [ ]
                let cumulativeIntegrityPaths = getAllFurthestPointersDirect (set | > Map.keys)
getIntegrityPointer
            ixMap
                | > Map.values
                | > Seq.map (fun r -
> { r with Integrity = if r.Integrity < 2 then r.Integrity else r.Integrity + cumulativeIn
tegrityPaths.[r.Block].Distance} )
        disjointSets | > Seq.collect doSet
    let IndexBlocks (blocks: seq<Block>) : IndexTable =
        blocks
        | > Seq.groupBy (fun b -> b.Chain)
        //parallelism introduced here...
        | > Seq.collect (snd >> Seq.map (fun b -
> b.Id, b) >> Map.ofSeq >> buildIndexForChain)
        | > List.ofSeq
```

FIG. 10 shows an index to retrieve data from a chain data structure containing sequential blocks having multiple ancestor pointers, in which a significant number of blocks have been lost. In this example, a chain of 60 blocks is considered, with each of the blocks having four ancestor pointers which have distances of 1, 3, 5, and 19. For purposes of discussion, the compound integrity of the blocks for the entire 60-block chain prior to the loss of blocks, i.e., the "original chain," will be compared to the compound integrity of the chain after the loss of blocks, i.e., "the remainder chain." An implementation of the methods described herein, such as the F #code presented above, may be used to generate an index (shown in FIG. 10) for the remainder chain. It is assumed that all of the blocks have a block-level integrity level of two, which means that the blocks are in the proper data format and claim to be part of a particular chain, and the block signatures are cryptographically valid and are signed by an identity who is authorized to contribute to the particular chain.

In the original chain, the compound integrity level of the block at the end of the chain, designated block b1-60, would be two, its block-level integrity, as there are no blocks to traverse to reach the end of the chain. The penultimate block in the original chain, block b1-59, would have a compound integrity of three—two for its block-level integrity and a compounding value of one (because block b1-60 is between block b1-59 and the end of the original chain). Thus, the compound integrity of each block in succession would increase by one in the direction toward the beginning of the chain. The block at the beginning of the original chain, designated block b1-01, would have the highest compound integrity, which would be 61. The average compound integrity for the blocks in the original chain would be 31.5.

For the remainder chain, it will be assumed that the following blocks have been lost: b1-01; b1-02; b1-03; b1-04; b1-05; b1-07; b1-11; b1-12; b1-14; b1-16; b1-17; b1-18; b1-20; b1-21; b1-23; b1-24; b1-25; b1-26; b1-30; b1-33; b1-35; b1-39; b1-41; b1-43; b1-44; b1-47; b1-48; b1-50; b1-51; b1-52; b1-53; b1-54; b1-56; b1-57; b1-59; b1-60. This represents a loss of 60% of the blocks, which is substantial. The lost blocks are not included in the index because they do not provide any connections and, therefore, are not taken into account in retrieving data from the chain data structure. By virtue of the multiple ancestor pointers, there are no disjoint sets of blocks, which means that all of the remaining blocks can be retrieved in sequence based on the index.

The index shown in FIG. 10 includes a calculated compound integrity value for each block in the remainder chain. The compound integrity level of the block at the end of the remainder chain, block b1-58, is two, its block-level integrity, as there are no blocks to traverse to reach the end of the chain. The penultimate block in the remainder chain, block b1-55, has a compound integrity of three—two for its block-level integrity and a compounding value of one (because block b1-58 is between block b1-55 and the end of the remainder chain).

It can be seen from the index that block b1-49, the block prior to block b1-55, forms an end of a disjoint set of blocks, because the distance between blocks b1-49 and b1-55 is six, which is not spannable by any of the ancestor pointers of distances 1, 3, 5, and 19 used in this example. Consequently, the compound integrity is two, its block-level integrity, as there are no blocks to traverse to reach the end of the chain, i.e., the end of the disjoint set of blocks ending at block b1-49. Similarly, it can be seen from the index that block b1-38, the block prior to block b1-40, also forms the end of a disjoint set of blocks, because the distance between previous block b1-38 and block b1-40 is two, which is not spannable by any the ancestor pointers of distances 1, 3, 5, and 19 used in this example. Moreover, following inbound pointers of block b1-38, of distances 1, 3, 5, and 19, toward the end of the chain (i.e., in a direction opposite to the direction of any ancestor pointers referencing block b1-38)

yields blocks b1-39, b1-41, b1-43, and b1-57, all of which are among the lost blocks. Thus, the compound integrity of block b1-38 is two, its block-level integrity, as there are no blocks to traverse to reach the end of the chain, i.e., the end of the disjoint set of blocks ending at block b1-38.

The average compound integrity for the blocks of the remainder chain is 7.0. This is significantly lower than the average compound integrity for the blocks of the original chain, 31.5, but considering that 60% of the blocks of the original chain have been lost, it is still a significant integrity improvement relative to the block-level integrity level of the original chain, i.e., two. Moreover, a significant majority of the blocks of the remainder chain remain connected, which allows the blocks to be retrieved largely in the proper sequence.

Figure 11:
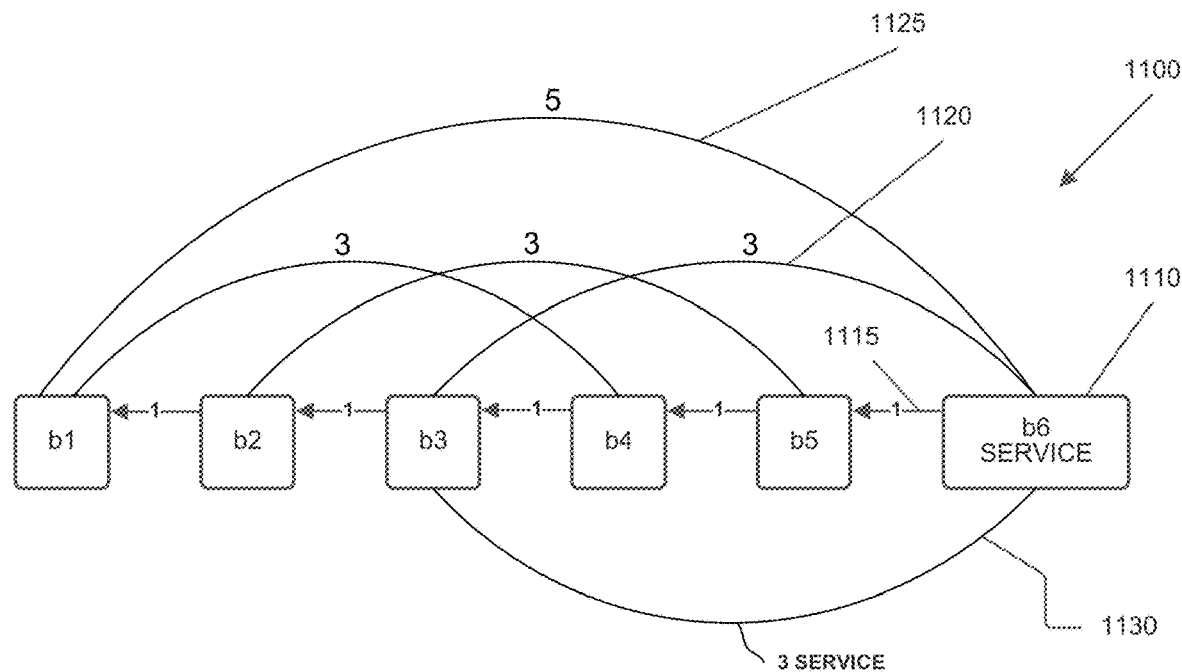
FIG. 11 is a diagram showing a chain data structure formed by sequential blocks and including a service block to perform operations on the sequential blocks.

FIG. 11 is a diagram showing a chain data structure 1100 formed by sequential blocks and including a service block, block b6 (1110), to perform operations on the sequential blocks. The service block 1110 has a plurality of ancestor pointers (1115, 1120, and 1125) to prior blocks b5, b3, and b1, respectively. The service block 1110 also has a service pointer 1130 which, in the example depicted, points to block b3, which is the target block for a service operation to be performed. The service block 1110 allows for various editing and utility operations to be done to blocks which cannot otherwise be changed due to the nature of chain data structures, which dictates that blocks cannot be edited or changed once they have been added to a chain data structure 1100. The service block 1110 allows for instructions for specific operations to be appended to the chain data structure 1100 to be performed on the target block, i.e., the block to which the service pointer 1130 is directed. Such service operations may include, for example, deleting a block, placing access restrictions on a block, modifying a block, splitting a block into two or more blocks, inserting a block, replacing a block (same as delete but with a new block added), indicating that a block is lost, and merging two chains.

The use of multiple ancestor pointers, e.g., 1115, 1120, and 1125, in conjunction with the use of service blocks (which may be referred as "edit blocks" or "amendment blocks") helps to ensure that the service block remains part of the chain data structure 1100 even if blocks are lost from the chain.

The instructions for the operations may be stored in the payload of the data structure of the service block 1110. Such instructions may include calls to services which would be retrieved and executed by the system. For example, if block b3 is to be deleted, the service block could contain instructions including a service call to a deletion service which would delete the target block (e.g., block b3). The instructions may also include service calls to modify the index for the chain data structure 1100 to modify stored indicators for previous blocks and next blocks so that the sequence of blocks can be revised to account for the deleted block. As a further example, if the data contained in block b3 is to be access controlled, the existing block b3 may be deleted and replaced by a new block b3', the contents of which may be encrypted. Alternatively, if only a portion of the block requires access controls and/or restrictions, the service block 1110 could contain the data from block b3 which is not subject to access control.

In implementations, service blocks (e.g., 1110) may be added to a chain periodically to encode inferred gaps in the chain data structure 1100, e.g., due to lost blocks. In such a case, the index for the chain data structure 1100 may be modified to bridge gaps left by lost blocks. For example, if block b0-12 is lost, then the index may be modified to indicate that block b0-11 is the previous block to block b0-13. Although this modification is based on inferred information, i.e., information which is derivable from the chain data structure, it may be helpful if, for example, blocks b0-11 and/or b0-13 are lost. Alternatively, this modification to the index may be done only when a block is intentionally deleted to avoid problems which may arise if the lost block, b0-12 is later found.

Figure 12:
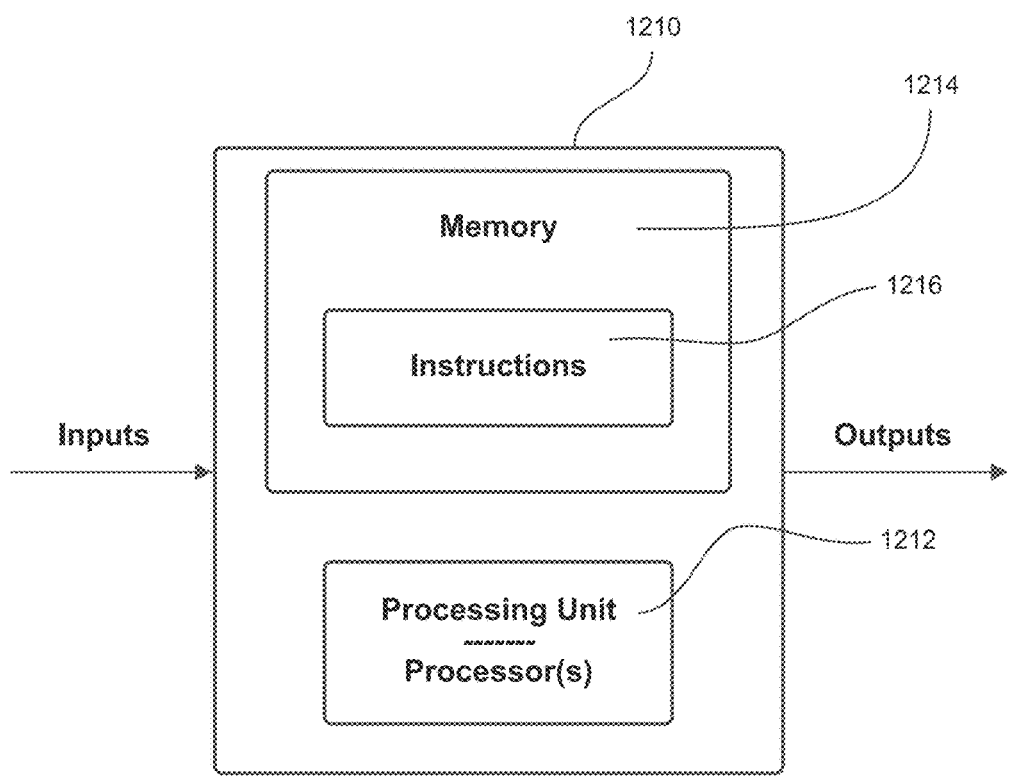
FIG. 12 is a block diagram of an example of a computing device usable to implement the methods described herein.

FIG. 12 is a block diagram of an example of a computing device 1210 usable to implement the methods described herein. The computing device 1210 comprises a processing unit 1212 and a memory 1214 which has stored therein computer-executable instructions 1216. The data storage and management system 100 (see FIG. 1), server 110, storage subsystem 120, and data management workstation 130, as well as other components described herein, may each be implemented by and/or comprise a computing device, such as the computing device 1210. The processing unit 1212 may comprise one or more processors or any other suitable devices configured to implement the method(s) described herein such that instructions 1216, when executed by the computing device 1210 or other programmable apparatus, may cause the method(s) described herein to be executed. The processing unit 1212 may comprise, for example, one or more of any type of general-purpose or specialized microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 1212 may be referred to as a "processor" or a "computer processor".

The memory 1214 may comprise any suitable machine-readable storage medium. The memory 1214 may comprise non-transitory computer readable storage medium, for example, but not limited to, an electronic, magnetic, optical, electromagnetic, infrared, or semiconductor system, apparatus, or device, or any suitable combination of the foregoing. The memory 1214 may include a suitable combination of any type of computer memory that is located either internally or externally to the device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1214 may comprise any storage means (e.g., devices) suitable for retrievably storing machine-readable instructions 1216 executable by processing unit 1212.

The methods and systems described herein may be implemented in a high-level procedural or object-oriented programming or scripting language, or a combination thereof, to communicate with or assist in the operation of a computer system, for example the computing device 1210. Alternatively, or in addition, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the methods described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 1212 of the computing device 1210, to operate in a specific and predefined manner to perform the methods described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims but should be construed to include all possible implementations along with the full scope of equivalents to which such claims are entitled. Accordingly, the claims are not limited by the disclosure.

What is claimed is:

1. A method of storing data with a secure chain data structure, the method comprising:
   grouping source data into a sequential chain of blocks comprising payload data;
   including into each of said blocks alongside said payload data a first hash value of an immediate prior block and additionally including into some of said blocks alongside said payload data at least one additional hash value of a non-immediate block prior to said immediate prior block;
   for each of said blocks of payload data, calculating a hash value of said block including said payload data and said first hash value or said first hash value and said at least one additional hash value;
   associating the hash value or values of each block with each block of said blocks of data;
   storing said blocks of data and their associated hash values to form a secure chain data structure;
   wherein blocks following a corrupted or unrecoverable block forming part of said chain beginning with a block having said at least one additional hash value of a block prior to the corrupted or unrecoverable block in said chain can be used to provide trust to blocks prior to the corrupted or unrecoverable block.

2. The method of claim 1, wherein said calculating comprises calculating a collision-resistant cryptographic hash value.

3. The method of claim 1, wherein said storing said blocks of data and their related hash values comprises storing each of said blocks with their respective said hash values.

4. The method of claim 3, wherein said storing said blocks of data and their related hash values comprises storing a pointer to said immediate prior blocks.

5. The method of claim 3, wherein said storing said blocks of data and their related hash values comprises storing a pointer to said non-immediate prior block for said at least some blocks of said blocks of data.

6. The method of claim 1, wherein said hash value is used as a logical filename in a data storage medium.

7. The method of claim 1, further comprising:
   building an index of said blocks of data.

8. The method of claim 7, further comprising adding to said index information concerning one or more of:
   a sequence of said blocks of data in a direction from earlier to later blocks;
   identifying when a block is missing;
   identifying when a block's data fails to be validated by its corresponding hash value;
   error correction data;
   how to skip over a missing or corrupted one or ones of said blocks of data.

9. A method of storing data with a secure chain data structure, the method comprising:
   grouping source data into blocks of data;
   calculating a hash value of an immediate prior block for each block of said blocks of data and a hash value of a non-immediate prior block for at least some blocks of said blocks of data, wherein said calculating said hash value is based on each block of said blocks of data and any hash value associated with said non-immediate prior block and with said immediate prior block, respectively;
   associating the hash value or values of each block with each block of said blocks of data;
   storing said blocks of data and their associated hash values to form a secure chain data structure;
   wherein trust can be provided to blocks in the secure chain data structure by later blocks containing valid hash values of prior blocks including valid ones of said hash values of non-immediate prior blocks, wherein said non-immediate prior block has a distance from a current block by a number of at least two.

10. The method of claim 9, wherein said number is a prime number.

11. The method of claim 9, wherein said number is greater than two.

12. The method of claim 9, wherein said number is variable.

13. A method of retrieving data in a chain data structure stored in blocks including a first hash value of an immediate prior block and for at least some blocks also including at least one additional hash value of a non-immediate prior block prior to said immediate prior block, the blocks thus forming a stored chain data structure, wherein trust is provided to blocks in the chain by later blocks containing valid hash values of prior blocks including valid ones of said hash values of non-immediate prior blocks, the method comprising:
   retrieving blocks from the stored chain data structure, wherein, when the chain data structure is broken by a corrupted or unrecoverable block, blocks following the corrupted or unrecoverable block forming part of said chain beginning with a block having said at least one additional hash value of a block prior to the corrupted or unrecoverable block in said chain are used to provide trust to blocks prior to the corrupted or unrecoverable block.

14. The method of claim 13, further comprising a method of storing data with a secure chain data structure as defined in claim 1.

15. The method of claim 14, wherein said retrieving blocks from said stored chain data structure comprises building an index of blocks and using said index of blocks to retrieve any desired portion of said blocks in a forward order from most prior to most later.

16. The method of claim 13, wherein a trust value is calculated for each one of said blocks retrieved and is provided as metadata with said blocks.

17. The method of claim 16, wherein said trust value is dependent on a number of said later blocks containing valid hash values of prior blocks.

18. A data storage and management system to store and retrieve data from a chain data structure, the system comprising one or more processors and memory, the memory of the data storage and management system storing a set of instructions that, as a result of execution by the one or more processors, cause the one or more processors to perform the method of claim 1.

19. A non-transitory computer-readable storage medium having computer-executable instructions stored thereon that, when executed, cause at least one computer processor to perform the method of claim 1.

20. A method of storing data with a secure chain data structure, the method comprising:
- grouping a set of source data into a payload portion of a current block to be stored in the secure chain data structure;
- obtaining a first hash value of a first preceding block stored in an immediately prior position to the current block in the secure chain data structure;
- obtaining a second hash value of a second preceding block stored in a non-immediately prior position to the current block in the secure chain data structure;
- associating the first hash value and the second hash value with the payload portion within the current block;
- calculating a hash value for the current block; and
- storing the current block and the hash value for the current block in the secure chain data structure;
- wherein integrity of a portion of the secure chain data structure subsequent to the current block is maintained following loss or corruption of the first preceding block using the second preceding block in the secure chain data structure and the second hash value present in the current block.

* * * * *